(12) United States Patent  (10) Patent No.: US 7,765,529 B1
Singh et al.  (45) Date of Patent: Jul. 27, 2010

(54) TRANSFORMING GRAPHICAL OBJECTS IN A GRAPHICAL MODELING ENVIRONMENT

(75) Inventors: Sanjai Singh, Bangalore (IN); John Ciolfi, Wellesley, MA (US)

(73) Assignee: The MathWorks, Inc., Natick, MA (US)

( * ) Notice: Subject to any disclaimer, the term of this patent is extended or adjusted under 35 U.S.C. 154(b) by 993 days.

(21) Appl. No.: 10/699,323

(22) Filed: Oct. 31, 2003

(51) Int. Cl.
G06F 9/45 (2006.01)
(52) U.S. Cl. .................. 717/134; 717/135; 717/138
(58) Field of Classification Search .............. None
See application file for complete search history.

(56) References Cited

U.S. PATENT DOCUMENTS

| | | | | |
|---|---|---|---|---|
| 5,621,880 A | * | 4/1997 | Johnson | 715/783 |
| 5,990,901 A | * | 11/1999 | Lawton et al. | 345/581 |
| 6,556,220 B1 | * | 4/2003 | Hammond | 715/764 |
| 6,762,757 B1 | * | 7/2004 | Sander et al. | 345/420 |
| 6,868,526 B2 | * | 3/2005 | Singh | 715/763 |
| 6,912,707 B1 | * | 6/2005 | Fontes, Jr. | 717/113 |
| 6,990,652 B1 | * | 1/2006 | Parthasarathy et al. | 717/107 |
| 2003/0206654 A1 | * | 11/2003 | Teng | 382/181 |

* cited by examiner

*Primary Examiner*—Chuck O Kendall
(74) *Attorney, Agent, or Firm*—Lahive & Cockfield, LLP; Kevin J. Canning

(57) ABSTRACT

In a graphical modeling environment, one of a selection of transformation operations is performed on a graphical object by first selecting the graphical object. A user may select a particular transformation operation to be executed on the graphical object from a list of transformation operations displayed to the user. A transformed graphical object derived from the selected graphical object may be then automatically created without retrieving the transformed graphical object from a library or other source.

44 Claims, 12 Drawing Sheets

TRANSFORMING GRAPHICAL OBJECTS IN A GRAPHICAL MODELING ENVIRONMENT

FIELD OF THE INVENTION

The present invention relates to a graphical object in a software application. More particularly, the present invention relates to modifying a graphical object.

BACKGROUND OF THE INVENTION

Copying graphical objects is a common operation in building and using software applications. Traditional copy operations on graphical objects have resulted in creation of new objects that are clones of the original object. Each new object has the same class type and the same properties as the original object.

One class of programs in which graphical object is copied is graphical modeling environments. Examples of graphical modeling environments include time-based block diagrams, such as Simulink from The MathWorks Inc., state-based and flow diagrams, such as those found within Stateflow® also available from The MathWorks, Inc., data-flow diagrams, such as LabVIEW, available from National Instruments Corporation, and software diagrams and other graphical programming environments, such as Unified Modeling Language (UML) diagrams.

Time-based block diagrams are software applications that enable a user to model, simulate, and analyze dynamic systems i.e., systems whose outputs change over time. Time-based block diagrams can be used to explore the behavior of a wide range of real-world dynamic systems, including electrical circuits, shock absorbers, braking systems, and many other electrical, mechanical, and thermodynamic systems.

Simulating a dynamic system in a time-based block diagram is typically a two-step process. First, a user creates a graphical model, such as a block diagram, of the system to be simulated. A graphical model may be created using a graphical user interface, such as a graphical model editor. The graphical model depicts time-based relationships between the systems inputs, states, parameters and outputs. After creation of the graphical model, the behavior of the dynamic system over a specified time period is simulated using the information entered into the graphical model. In this step, the graphical model is used to compute and trace the temporal evolution of the dynamic systems' outputs ("execute the graphical model"), and automatically produce either deployable software systems or descriptions of hardware systems that mimic the behavior of either the entire model or portions of the model (code generation).

Block diagrams are graphical entities having an "executable meaning" that are created within time-based block diagrams for modeling a dynamic system, and generally comprise one or more graphical objects. For example, a block diagram model of a dynamic system is represented schematically as a first collection of graphical objects, such as nodes, which are interconnected by another set of graphical objects, generally illustrated as lines, which represent logical connections between the first collection of graphical objects. In most block diagramming paradigms, the nodes are referred to as blocks and drawn using some form of geometric object (e.g., circle, rectangle, etc.). The line segments are often referred to as signals. Signals correspond to the time-varying quantities represented by each line connection and are assumed to have values at each time instant. Each node may represent an elemental dynamic system, and the relationships between signals and state variables are defined by sets of equations represented by the nodes. Inherent in the definition is the notion of parameters, which are the coefficients of the equations. These equations define a relationship between the input signals, output signals, state, and time, so that each line represents the input and/or output of an associated elemental dynamic system. A line emanating at one node and terminating at another signifies that the output of the first node is an input to the second node. Each distinct input or output on a node is referred to as a port. The source node of a signal writes to the signal at a given time instant when its system equations are solved. The destination node of this signal read from the signal when their system equations are being solved. Those skilled in the art will recognize that the term "nodes" does not refer exclusively to elemental dynamic systems but may also include other modeling elements that aid in readability and modularity of block diagrams.

For example, in Simulink®, an example of a time-based block diagram environment from The MathWorks Inc., a model of a dynamic system is a block diagram comprising a number of graphical objects. Generally, a block diagram comprises a plurality of nodes, called blocks, which are interconnected by lines that represent signals. In Simulink®, each block represents a functional entity, such as an elementary dynamic system, which implements a mathematical operation, i.e., an algorithm or equation, on the data being processed by the system represented by the block diagram. Each block produces an output either continuously (a continuous block) or at specific points in time (a discrete block). The type of the block determines the relationship between a block's outputs and its inputs, states, and time. A block diagram can contain any number of instances of any type of block needed to model a system. The signals in a block diagram model represent a time-varying quantity that is updated, i.e. ready-by and written-to, by the blocks. Simulink® and other software products for modeling a dynamic system provide a graphical user interface (GUI) for building models of dynamic systems as block diagrams. Each block diagram may be built by dragging and dropping blocks provided in predefined blocksets or custom developed by the user.

Other examples of block diagrams include state chart diagrams such as those found within Stateflow, also available from The MathWorks, Inc, data flow diagrams, and so on. Many graphical modeling systems employing block diagrams are hierarchical. A hierarchical diagram consists of 'layers' where a layer is a diagram in itself and is represent in the 'parent' layer as a single block. Connections to the block are routed into the lower layer.

During construction of a block diagram model, a user often copies blocks into the window displaying the model from a library, such as a block library, another model, or the model under construction. To copy a block from a library or other model into the model under construction, a user first opens the appropriate block library or model window. Then, the user drags the block to copy into the target model window. According to one method, a user drags a block by positioning a cursor over the block icon, then pressing and hold down the mouse button to select the block icon. The user moves the cursor into the target window, and releases the mouse button to position the block. Blocks may also be dragged from a library browser into a model window.

Blocks may also be copied using "Copy" and "Paste" commands from an Edit menu. For example, a user may select a block to copy, choose "Copy" from the Edit menu, activate the target model window and select "Paste" from the Edit menu to copy a block.

In the current state of the art, when a user copies a block, the new block automatically inherits all the original block's graphical representation and parameter values. The user must then manually edit the copied block to modify the properties of the copied block, which can be time-consuming.

SUMMARY OF THE INVENTION

In an illustrative embodiment of the present invention, a method of constructing a block diagram includes executing a transformation operation on a selected graphical object in the block diagram to create a transformed graphical object derived from the selected graphical object. The illustrative embodiment provides clear, concise and efficiently constructed block diagrams by enabling construction of a variety of graphical objects based on a first graphical object in a block diagram.

According to one aspect of the invention, a method of building a block diagram representing a dynamic system is provided, which comprises the steps of a user selecting a graphical object in the block diagram and displaying to a user a plurality of transformation operations to be performed on the selected graphical object. Optionally, the user may then select one of the transformation operations, and the selected transformation operation is then executed on the selected graphical object to create a transformed graphical object.

According to another aspect of the invention, a method of building a block diagram representing a dynamic system is provided, which comprises the steps of a user selecting a first graphical object in the block diagram and executing a copy and morph operation on the first graphical object. The copy and morph operation creates a second graphical object based on the first graphical object, wherein the second graphical object has one or more properties that are different from the first graphical object.

According to another aspect of the invention, a method of building a block diagram representing a dynamic system is provided, which comprises the steps of a user selecting a first graphical object in the block diagram and executing a morph operation on the first graphical object. The morph operation changes one or more properties of the selected graphical object to create a transformed graphical object based on the selected graphical object.

According to yet another aspect, a medium holding computer-executable instructions for a method is provided. The method comprises the steps of a user selecting a graphical object in the block diagram and displaying to a user a plurality of transformation operations to be performed on the selected graphical object. Optionally, the user may then select one of the transformation operations, and the selected transformation operation is then executed on the selected graphical object to create a transformed graphical object.

According to yet another aspect, a medium holding computer-executable instructions for a method is provided. The method comprises the steps of a user selecting a graphical object in the block diagram executing a copy and morph operation on the first graphical object. The copy and morph operation creates a second graphical object based on the first graphical object, wherein the second graphical object has one or more properties that are different from the first graphical object.

According to yet another aspect, a medium is provided that holds computer-executable instructions for a method comprising a user selecting a graphical object in a block diagram, and executing a morph operation on the selected graphical object. The morph operation changes one or more properties of the selected graphical object to create a transformed graphical object based on the selected graphical object.

According to still another aspect of the invention, a system for generating and displaying a block diagram application for simulating a dynamic system is provided. The system comprises a user-operable input means for inputting data to the block diagram application, a display device for displaying a block diagram representing the dynamic system and an electronic device including memory for storing computer program instructions and data, and a processor for executing the stored computer program instructions. The computer program instructions include instructions for displaying a plurality of transformation operations to be performed on a graphical object after the user selects the graphical object.

According to yet another aspect of the invention, a system for generating and displaying a block diagram application for simulating a dynamic system is provided. The system comprises a user-operable input means for inputting data to the block diagram application, a display device for displaying a block diagram representing the dynamic system and an electronic device including memory for storing computer program instructions and data, and a processor for executing the stored computer program instructions. The computer program instructions include instructions for executing a copy and morph operation on a first graphical object in the block diagram to create a second graphical object based on the first graphical object when a user selects the first graphical object. The second graphical object has one or more properties that are different from the first graphical object.

According to still another aspect of the invention, a system for generating and displaying a block diagram application for simulating a dynamic system is provided. The system comprises a user-operable input means for inputting data to the block diagram application, a display device for displaying a block diagram representing the dynamic system and an electronic device including memory for storing computer program instructions and data, and a processor for executing the stored computer program instructions. The computer program instructions include instructions for executing a morph operation on a selected graphical object in the block diagram to change one or more properties of the selected graphical object when a user selects the first graphical object, thereby creating a transformed graphical object based on the selected graphical object.

DETAILED DESCRIPTION OF THE INVENTION

In an illustrative embodiment, the present invention provides a graphical modeling environment, such as a time-based block diagram, which enables a user to model a process easily and intuitively. The illustrative embodiment of the present invention provides an improved tool for modeling, simulating, and/or analyzing dynamic systems, which enables a user to select from several possible transformation operations when the user selects a graphical object in a block diagram. The present invention will be described below relative to an illustrative embodiment with respect to a time-based block diagram, though the invention may be implemented in any suitable graphical modeling environment. Those skilled in the art will appreciate that the present invention may be implemented in a number of different applications and embodiments and is not specifically limited in its application to the particular embodiments depicted herein.

Figure 1A:
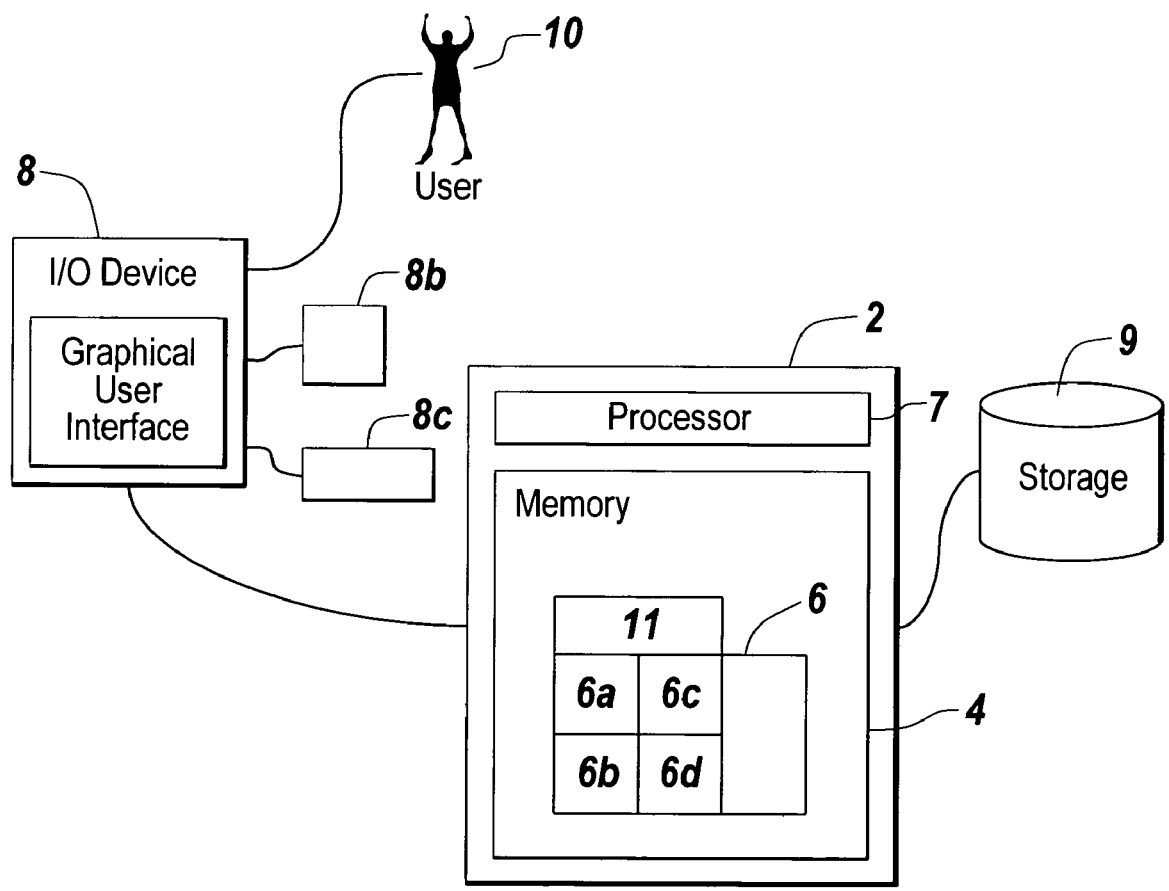
FIG. 1A illustrates an environment suitable for practicing an illustrative embodiment of the present invention.

FIG. 1A depicts an environment suitable for practicing an illustrative embodiment of the present invention. An electronic device 2 includes memory 4, on which software according to one embodiment of the present invention is stored, a processor (CPU) 7 for executing software stored in the memory, and other programs for controlling system hardware. Typically, the interaction of a human user with the electronic device 2 occurs through an input/output (I/O) device 8, such as a graphical user interface (GUI). The I/O device 8 may include a display device 8a (such as a monitor) and an input device (such as a mouse 8b and a keyboard 8c and other suitable conventional I/O peripherals.

For example, the memory 4 holds a modeling application 6 capable of creating and simulating electronic versions of system diagrams such as block diagrams, state diagrams, signal diagrams, flow chart diagrams, sequence diagrams, UML diagrams, dataflow diagrams, circuit diagrams, ladder logic diagrams or kinematic element diagrams, which may be displayed to a user 10 via the display device 8a. In the illustrative embodiment, the modeling application 6 comprises a time-based block diagram environment, such as Simulink® or another suitable other graphical modeling environment, though one skilled in the art will recognize that the invention is not limited to time-based block diagram models. As used herein, "time-based block diagram environment" refers to a graphical application where a model is translated into executable instructions. Examples of suitable modeling applications include, but are not limited to MATLAB, version 6.1 with Simulink, version 5.0 from the MathWorks, LabVIEW, DasyLab and DiaDem from National Instruments Corporation, VEE from Agilent, SoftWIRE from Measurement Computing, VisSim from Visual Solutions, SystemVIEW from Elanix, WiT from Coreco, Vision Program Manager from PPT Vision, Khoros from Khoral Research, and numerous others. The memory 4 may comprise any suitable installation medium, e.g., a CD-ROM, floppy disks, or tape device; a computer system memory or random access memory such as DRAM, SRAM, EDO RAM, Rambus RAM, etc.; or a non-volatile memory such as a magnetic media, e.g., a hard drive, or optical storage. The memory may comprise other types of memory as well, or combinations thereof.

In an alternate embodiment, the electronic device 2 is also interfaced with a network, such as the Internet. Those skilled in the art will recognize that the diagrams used by the modeling application 6 may be stored either locally on the electronic device 2 or at a remote location 9 interfaced with the electronic device over a network. Similarly, the modeling application 6 may be stored on a networked server or a remote peer.

The modeling application 6 of an illustrative embodiment of the invention includes a number of generic components. Although the discussion contained herein focuses on Simulink, version 5.0 (Release 13) from The MathWorks, Inc. of, Natick Mass., those skilled in the art will recognize that the invention is applicable to other software applications. The generic components of the illustrative modeling program 6 include a block diagram editor 6a for graphically specifying models of dynamic systems. The block diagram editor 6a allows users to perform such actions as construct, edit, display, annotate, save, and print out a graphical model, such as a block diagram, that visually and pictorially represents a dynamic system. The illustrative modeling application 6 also includes graphical entities 6b, such as signal lines and buses that represent how data is communicated between functional and non-functional units, and blocks 6c. As noted above, blocks are the fundamental mathematical elements of a classic block diagram model. A block diagram execution engine 6d, also implemented in the application, is used to process a graphical model to produce simulation results or to convert the graphical model to executable code.

In the illustrative embodiment, the modeling program 6 is implemented as a companion program to a technical computing program 11, such as MATLAB, also available from the MathWorks, Inc.

Figure 1B:
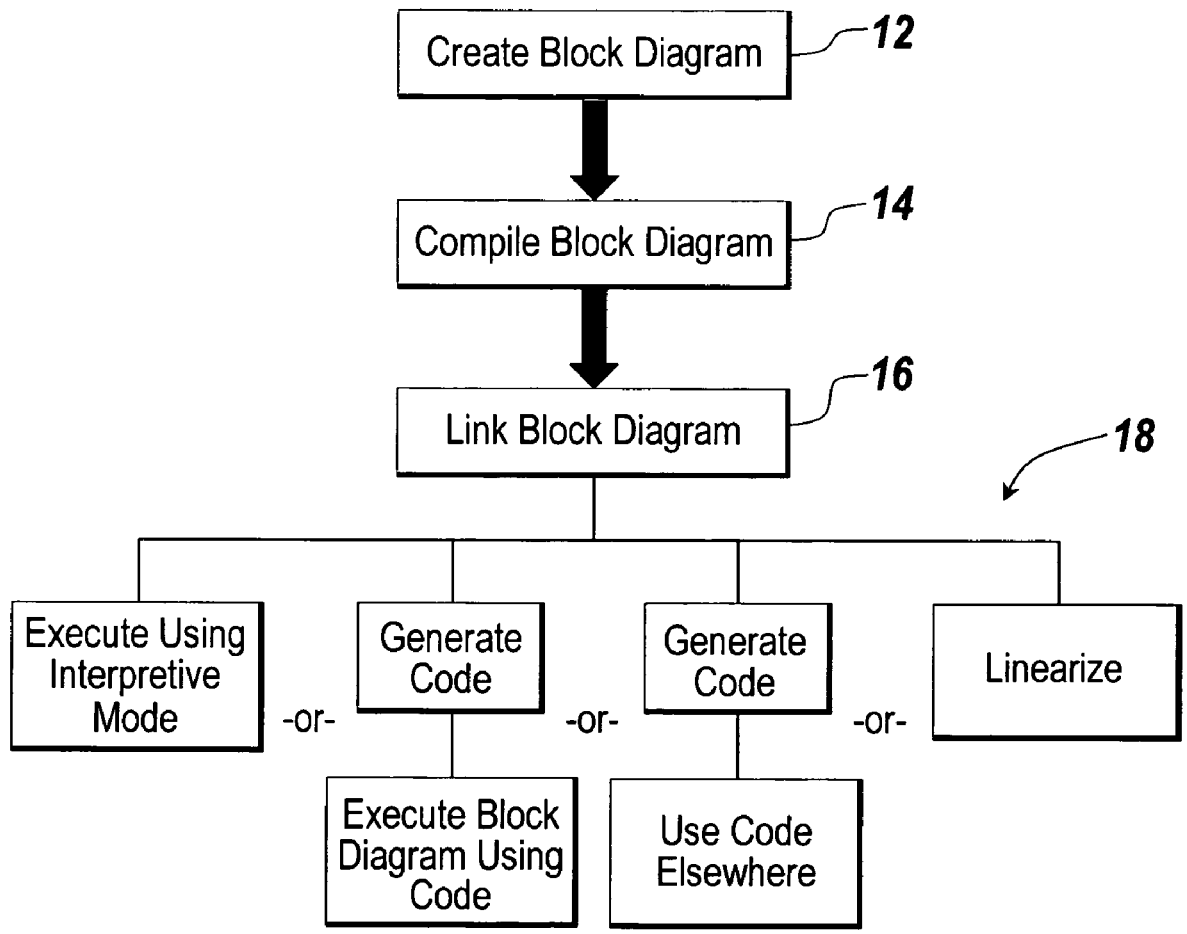
FIG. 1B is a flow chart illustrating the steps involved in simulating a dynamic system using the environment shown in FIG. 1A.

FIG. 1B is a flow chart diagramming the steps involved in simulating a dynamic system according to an illustrative embodiment of the invention. In step 12, a user creates a model, such as a block diagram model representing a dynamic system, though one skilled in the art will recognize that the invention is not limited to block diagram models. After creating the block diagram model in step 12, the execution engine 6d compiles the block diagram in step 14. Then, in step 16, the execution engine links the block diagram in to produce an "in-memory executable" version of the model. In step 18, the execution engine uses the "in-memory executable" version of the model to generate code and/or simulate or linearizing a block diagram model.

In the illustrative modeling application 6, the block diagram editor 6a is the graphical user interface (GUI) component that allows a user to create and modify a block diagram model representing a dynamic system, in step 12. The blocks in the electronic block diagram may model the behavior of specialized mechanical, circuit or software components, such as motors, servo-valves, power plants, filters, tires, modems, receivers and other dynamic components. The block diagram editor 6a also allows a user to create and store data relating to graphical entities 6b. In Simulink®, a textual interface with a set of commands allows interaction with the graphical editor. Using this textual interface, users may write special scripts that perform automatic editing operations on the block diagram. A user generally interacts with a set of windows that act as canvases for the model. There is generally more than one window for a model because models may be partitioned into multiple hierarchical levels through the use of subsystems.

A suite of GUI tools within the block diagram editor 6a allows users to draft a block diagram model on the corresponding windows. For example, in Simulink® the GUI tools, include a block palette, a wiring line connection tool, an annotation tool, a formatting tool, an attribute editing tool, a save/load tool and a publishing tool. The block palette is a library of all the pre-defined blocks available to the user for building the block diagram. Individual users may be able to customize this palette to: (a) reorganize blocks in some custom format, (b) delete blocks they do not use, and (c) add custom blocks they have designed. The palette allows blocks to be dragged through some human-machine interface (such as a mouse or keyboard) from the palette on to the window (i.e., model canvas). The graphical version of the block that is rendered on the canvas is called the icon for the block. There may be different embodiments for the block palette including a tree-based browser view of all of the blocks.

Once a block diagram model, or other graphical model, has been constructed using the editor 6a in step 12, the execution engine 6d simulates the model by solving equations defined by the model to trace the system outputs as a function of time, in steps 14-18. The solution of the model, which may be referred to as model execution, is carried out over a user-specified time span for a set of user-specified inputs.

The compile stage in step 14 marks the start of model execution and involves preparing data structures and evaluating parameters, configuring and propagating block characteristics, determining block connectivity, and performing block reduction and block insertion. The compile stage involves checking the integrity and validity of the block interconnections in the block diagram. In this stage, the engine 6d also sorts the blocks in the block diagram into hierarchical lists that are used when creating the block method execution lists. The preparation of data structures and the evaluation of parameters create and initialize basic data-structures needed in the compile stage. For each of the blocks, a method forces the block to evaluate all of its parameters. This method is called for all blocks in the block diagram. If there are any unresolved parameters, execution errors are thrown at this point.

During the configuration and propagation of block and port/signal characteristics, the compiled attributes (such as dimensions, datatypes, complexity, or sample time) of each block (and/or ports) are setup on the basis of the corresponding functional attributes and the attributes of blocks (and/or ports) that are connected to the given block through lines. The attribute setup is performed through a process during which block functional attributes "ripple through" the block diagram from one block to the next following signal connectivity. This process (referred to herein as "propagation"), serves two purposes. In the case of a block that has explicitly specified its block (or its ports') functional attributes, propagation helps ensure that the attributes of this block are compatible with the attributes of the blocks connected to it. If not, an error is issued. For example, if an Integrator block is implemented to only accept numbers of double precision datatype, then this block will error out if it is driven by a block that produces single precision data, unless the user has asked for an implicit data conversion. Secondly, in many cases blocks are implemented to be compatible with a wide range of attributes. Such blocks adapt their behavior in accordance with the attributes of the blocks connected to them. This is akin to the concept of polymorphism in object-oriented programming languages. For instance, a discrete-time Filter block could be implemented to accept any of the standard integer datatypes ranging from 8-bit to 128-bit. The exact implementation of the block is chosen on the basis of the specific block diagram in which this block finds itself. Included within this step are other aspects such as validating that all rate-transitions within the model yield deterministic results and that the appropriate rate transition blocks are being used.

The compilation step also determines actual block connectivity. Virtual blocks play no semantic role in the execution of a block diagram. During compilation, the virtual blocks and signals, such as bus signals, in the block diagram are optimized away (removed) and the remaining non-virtual blocks are reconnected to each other appropriately. This compiled version of the block diagram with actual block connections is used from this point forward in the execution process Once actual block connectivity has been determined (by removing the virtual blocks) the block diagram may be further optimized by performing block reduction and insertion. During this step, non-virtual blocks may be inserted or a set of non-virtual blocks may be completely removed or reduced to a single equivalent block. Block insertion and reduction is mainly done to improve execution efficiency.

In the link stage, in step 16, the execution engine 6d uses the result of the compilation stage to allocate memory needed for the execution of the various components of the block diagram. The linking stage also produces block method execution lists, which are used by the simulation or linearization of the block diagram. Included within the link stage is the initialization of the model, which consists of evaluating "setup" methods (e.g. block start, initialize, enable, and constant output methods). The block method execution lists are generated because the simulation and/or linearization of a model must execute block methods by type (not by block) when they have a sample hit.

The compiled and linked version of the block diagram may be directly utilized to execute the model over the desired time-span, in step 18. According to one aspect, after linking has been performed, the execution engine 6d may generate code in step 18 to produce software from the block diagram. In this stage, the execution engine may choose to translate the block diagram model (or portions of it) into either software modules or hardware descriptions (broadly termed code). If this stage is performed, then the stages that follow use the generated code during the execution of the block diagram. Alternatively, the execution engine skips generating code in step 18 and uses an interpretive mode of execution for the block diagram. In another embodiment, the execution engine 6d only generates code in step 18. For example, a user may not proceed further with the execution of the block diagram because he would like to deploy the code outside the confines of the block diagram software.

Upon reaching the simulation stage, the execution engine 6d uses a simulation loop to execute block methods in a pre-defined ordering upon a sample hit to produce the system responses they change with time.

To perform a linearization in step 18, Simulink uses the block method execution lists in a prescribed fashion to produce a linear state space representation of the dynamic system described by the block diagram.

A block diagram model of a dynamic system, created during step 20, is generally represented schematically as a collection of interconnected graphical objects, such as blocks, ports and lines, which represent signals. Each block represents an elemental dynamic system. A signal represents the input and output of an elemental dynamic system. A line emanating at one block and terminating at another signifies that the output of the first block is an input to the second block. A port, such as an input port and an output port, refers to a distinct input or output on a block. Signals correspond to the time-varying quantities represented by each line connection and are assumed to have values at each time instant. A source block for a signal writes to the signal at a given time instant when its system equations are solved. A destination block for a signal reads from the signal when the system equation is being solved.

Figure 2A:
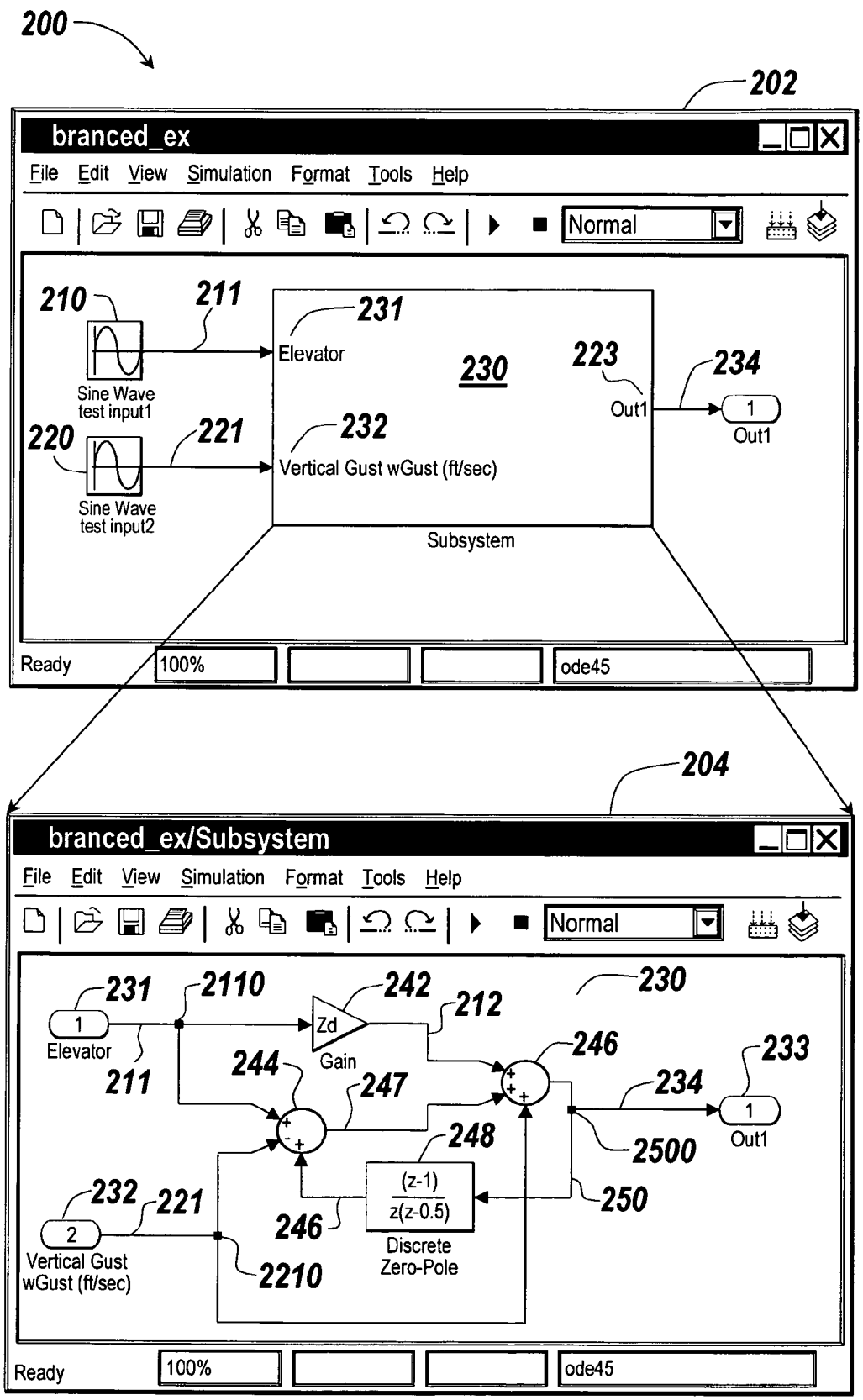
FIG. 2A illustrates a block diagram of a dynamic system in a graphical modeling environment of the prior art.

FIG. 2A illustrates an example of a block diagram 200 created in a time-based block diagram environment of the prior art for modeling a feedback system. One skilled in the art will recognize that the block diagram 200 is merely illustrative of a typical application in the prior art and is not intended to limit the present invention in any way. As shown, the block diagram of FIG. 2A includes two layers in the hierarchy: window 202 displays a top level diagram, i.e., a "parent layer" and window 204 displays the details of a subsystem 230, i.e., a "lower layer" within the top level diagram. The top level diagram includes a first source block 210, illustrated as a sine wave block for generating a sine wave, and a second source block 220, illustrated as another sine wave block for generating another sine wave. The signals 211 and 221 from the first and second source block, respectively, connect to the input ports 231, 232 of the subsystem block 230. The output port 233 of the subsystem block 230 connects to output signal 234.

Within the subsystem block 230, the input signals 211 and 221 are accessed using blocks called "Inport blocks". As shown in window 204, the subsystem block 230 includes a first input port block 231 (labeled "Elevator") for accessing the first signal 211 passed to the subsystem and a second input port block 232 (labeled "Vertical Gust") for accessing the second signal 221 passed the subsystem 230. The signal from the first input port 231 passes to a branch point 2110, which branches the signal 211 into two branches. A first branch passes to a gain block 242, which multiplies the input signal 211 by a selected value to generate a multiplied signal 212, and a second branch passes to a first summing block 244, which generates a sum signal 247 comprising values representing the sum of the inputs 211, 221 and 246 to the block. The second signal 221 from the second input port 232 also passes to a branch point 2210, and a first branch passes to the first summing block 244, while a second branch passes to a second summing block 246, which generates a sum 250 of inputs 221, 247 and 212. The output of the first summing block 244 also passes as an input to the second summing block 246. The output signal 234 of the second summing block 246 passes to a branching point 2500, and a first branch passes to an output port 233 of the subsystem 230. The second branch 250 of the output signal passes to a continuous block 248, illustrated as a discrete zero-pole block for implementing a discrete transfer function specified in terms of poles and zeros. After implementing the specified function on the signal 250, the output signal 246 passes to the first summing block 244.

A block diagram, such as the block diagram 200 of FIG. 2A, may be constructed by means of a computerized graphical user Windows® interface in which the various required graphical objects (blocks, lines, ports, etc) are picked from pull-down lists or pop-up palettes and dragged into position on the computer screen. Default values for the various required alphanumeric labels may be automatically generated and displayed for possible subsequent editing by the user. Furthermore, templates for many commonly used generic functions and function blocks are available for copying from a shared library.

For example, the user can point at graphical objects in the block diagram 200 that are displayed on the display device 8a with a moving cursor that can be controlled by the user through the movement of an input device, such as a mouse 8b (shown in FIG. 1A). A user can point at displayed objects and execute designated functions in correlation with these objects by clicking mouse buttons or using a scrolling wheel on the mouse. For example, when the position of the mouse cursor overlaps with the position of a graphical object on a display device of a computer system, different actions or functions can be executed for that object by using different buttons, such as the left or right mouse button. Typically, when clicking the left button once, the object is selected and, when clicking the left button twice, a program associated with the object is launched. Depending on the type of the object, launching can be, for example, to load the object into an editor of a word processing program or to start an executable program on the computer. When clicking the right button once, a context menu may be shown on the display device. The context menu provides an extended list of functions that can be executed for that object, usually also comprising the functions of the left button. For example, predefined functions in the context of a text object may include: to send the object to a printer; to delete the object; or to send it by e-mail to another person. Designated functions may also be executed using commands that are entered in a command line editor.

A significant drawback to prior time-based block diagrams applications for constructing and modifying a block diagrams and other graphical modeling environments are that the resulting block diagrams are often complex and include excess wiring, which reduces the clarity of the block diagram and can result in a visually unappealing model. In a complex model, signals may branch into multiple locations, and/or cross each other, which can clutter the block diagram. For example, in the block diagram 200 shown in FIG. 2A, signal 250 crosses signal 221, which can be confusing and problematic. The extra wiring tends to reduce the readability of the diagram. Another drawback is that complex models often require a significant amount of time to enter data. Each graphical object must be selected from a library or copied from another graphical object, and parameters for each graphical object are generally selected and entered by the user.

Figure 2B:
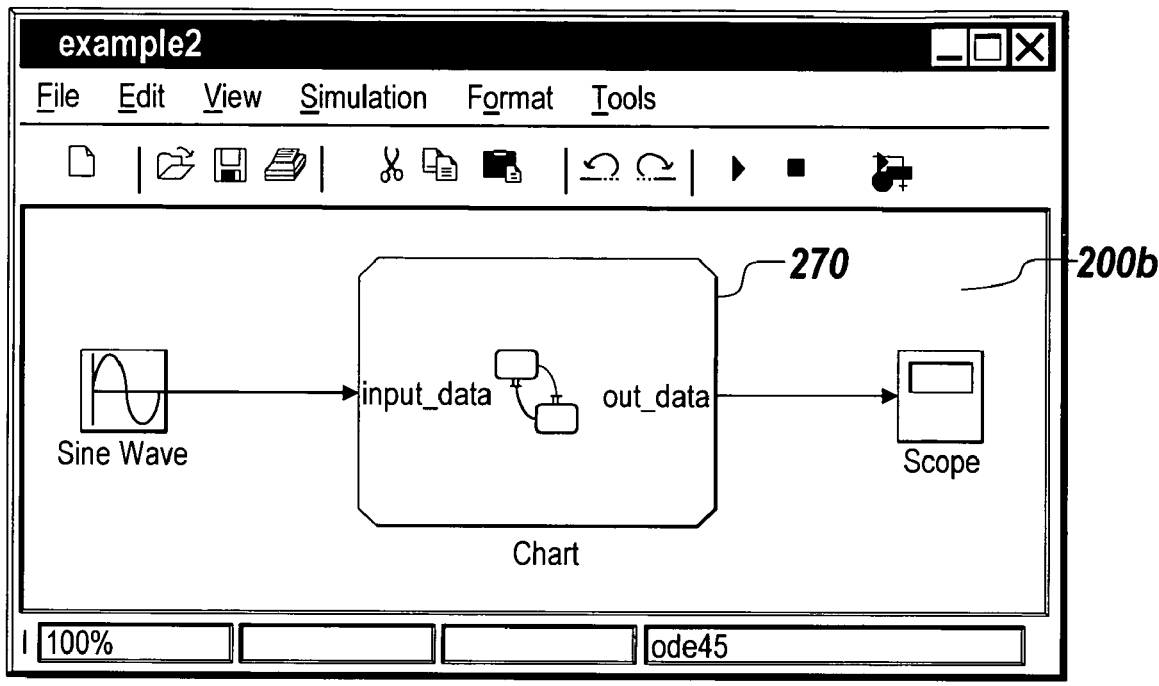
FIG. 2B illustrates a block diagram including a Stateflow chart in a graphical modeling environment of the prior art.

One skilled in the art will recognize that the invention is not limited to the illustrated block diagram 200 and that the invention may be implemented in other types of graphical models within a graphical modeling environment. For example, as shown in FIG. 2B, an illustrative embodiment of the invention may be implemented in a graphical model 200b that includes a Stateflow chart 270 or other suitable tool for modeling and simulating event-driven systems. A Stateflow chart is a graphical representation of a finite state machine where states and transitions form the basic building blocks of the system. A Stateflow chart may be represented within a block diagram model as a block, as shown in FIG. 2B.

Figure 2C:
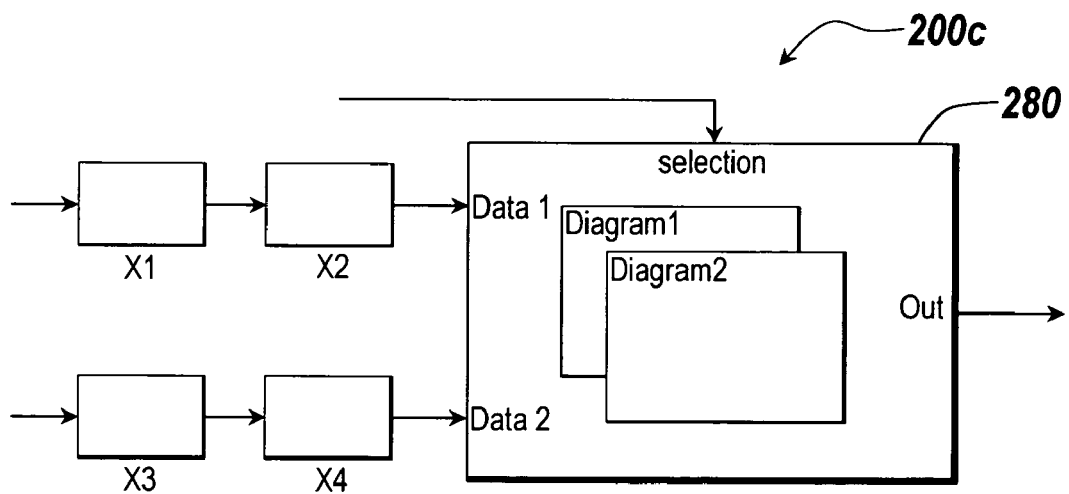
FIG. 2C illustrates a block diagram including a data flow chart in a graphical modeling environment of the prior art.

Another type of graphical model 200c, shown in FIG. 2C may include a data flow diagram 280. Data flow block diagrams are block diagrams that describe a graphical programming paradigm where the availability of data (often thought of as tokens) is used to initiate the execution of blocks, where a block represents an operation and a line represents execution dependency describing the direction of data flowing between blocks.

Figure 3A:
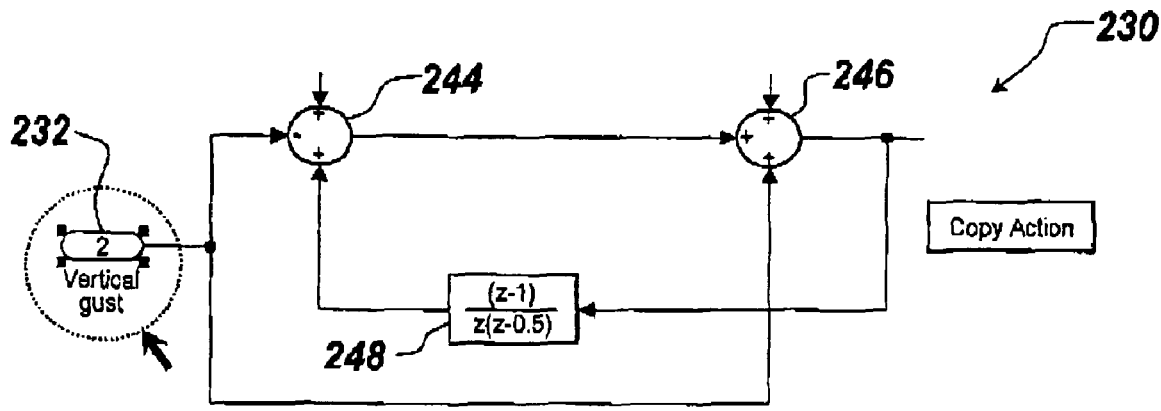
FIGS. 3A and 3B illustrates a copying operation of the prior art performed on an inport block of the block diagram of FIG. 2A.
Figure 3B:
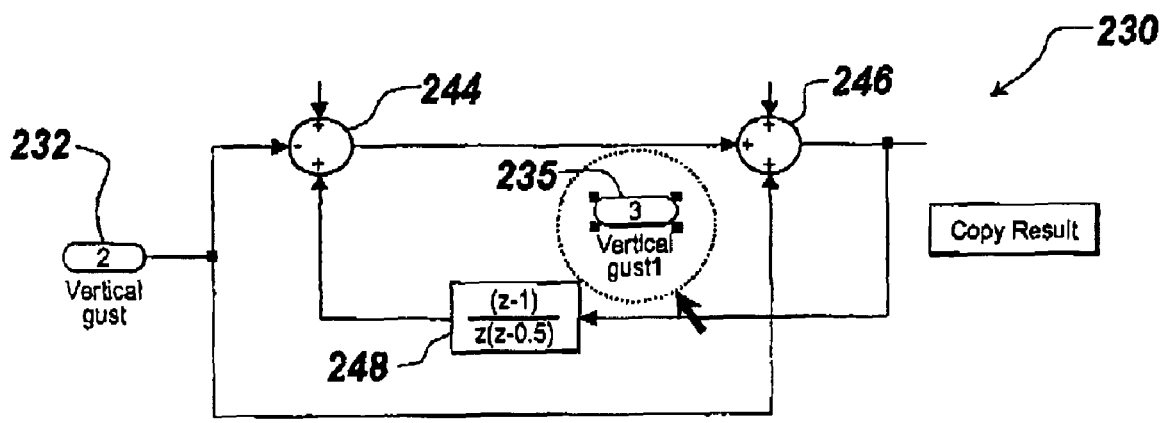

FIGS. 3a and 3b illustrate a copy operation performed on a graphical object in a block diagram of the prior art, such as the block diagram of FIG. 2A. In prior graphical modeling environments, such as time-based block diagrams, copying an inport block, such as input port block 232, results in a new inport port block 235 whose port number ("3") is different from the original inport block 232 (input number "2"). The new port number is such that the inport is unique within the particular system it is copied to. For example, as shown in FIGS. 3a, and 3b, performing a copy operation on the "Vertical gust" block 232 results in a third inport block named "Vertical gust1" 235.

As shown, an example of a standard copy operation in a modeling application of the prior art includes first selecting a graphical object to be copied, such as the input port block 232, through conventional techniques. For example, a graphical object may be selected by positioning the mouse cursor such that it overlaps with the icon of the graphical object and clicking the left mouse button to select the graphical object. After selecting the graphical object to be copied, the user can execute a copy function. For example, the user can click the right mouse button (a "right-click drag operation") to instruct the program to execute a copy operation. The copy operation allows a user to copy the graphical object to a new location in the block diagram or in a different block diagram without requiring the user to return to a library. In the current state of the art, the "right-click drag operation" only gives the user the option of copying a first graphical object to create a new graphical object having a different name but otherwise identical properties to the first graphical object.

In an illustrative embodiment of the present invention, a modeling application facilitates clear and concise block diagrams by providing multiple options to a user when a user selects a graphical object in a diagram, such as a block diagram, a library, or other location. For example, when a user selects the graphical object, the modeling application may display a menu on a display device that lists a selection of different transformation operations that can be executed on the selected graphical object. As used herein, the phrase "transformation operation" refers to an operation performed on a selected graphical object (an "original" or "parent" graphical object), which creates a new graphical object (a "transformed" or "child" graphical object) based on the selected graphical object. As used herein, the term "graphical object" refers to an object in a block diagram of a graphical modeling environment, including, but not limited to: an icon, text and a line.

Figure 4:
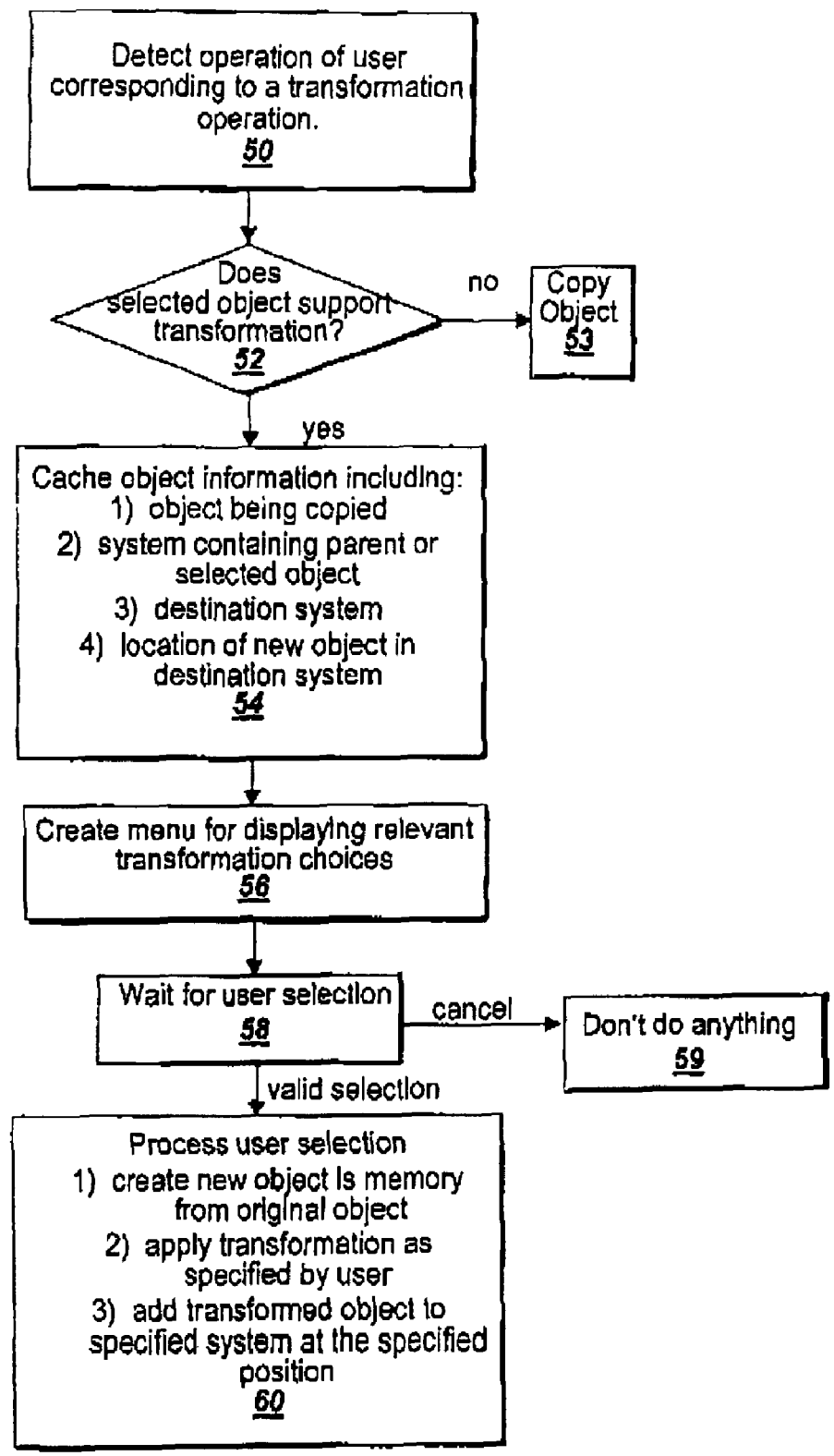
FIG. 4 is a flow chart illustrating the steps for implementing a transformation operation according to an illustrative embodiment of the invention.
Figure 5A:
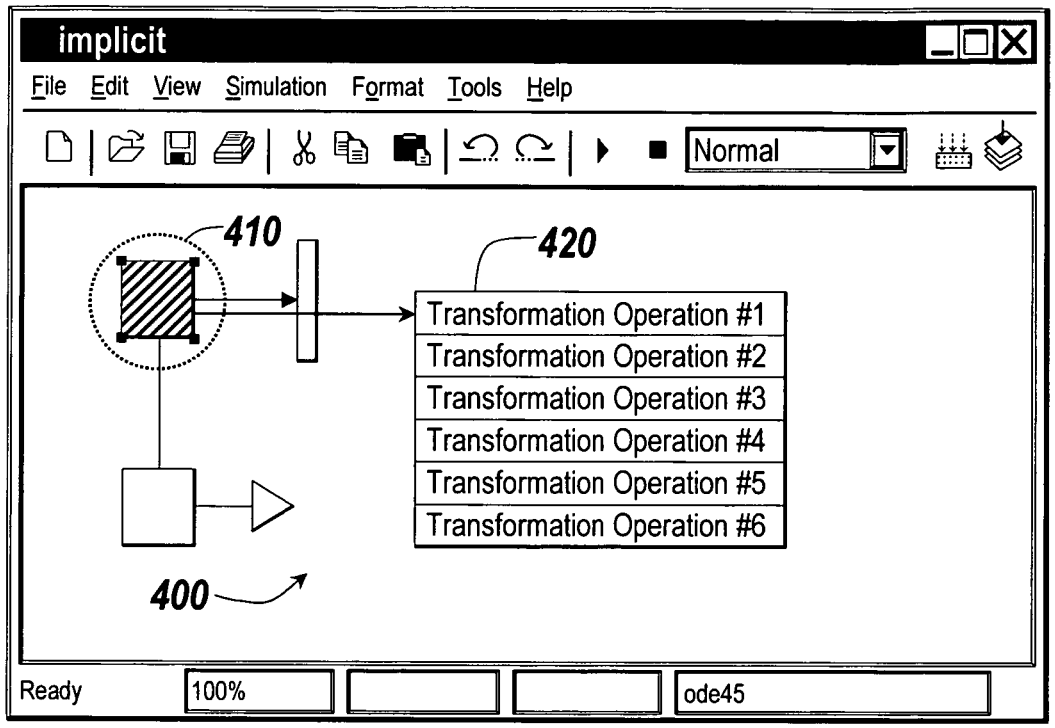
FIG. 5A illustrates a block diagram according to an illustrative embodiment of the invention, which displays a menu allowing a user to select one of a plurality of different transformation operations to be performed on a graphical object in the block diagram.
Figure 5B:
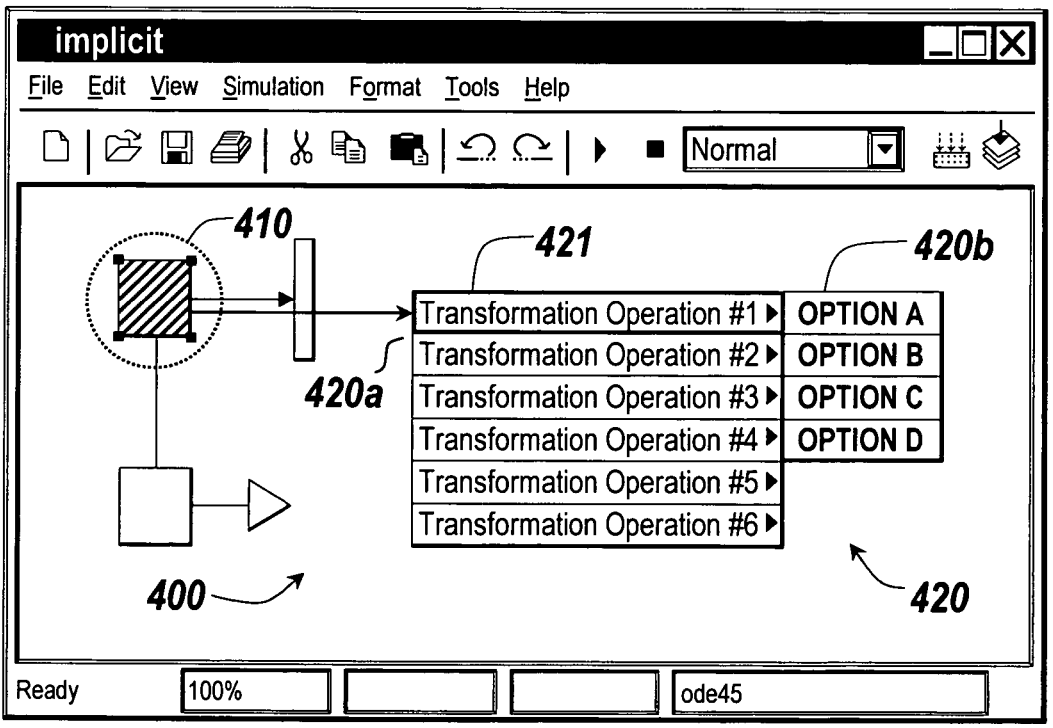
FIG. 5B illustrates a block diagram according to an alternate embodiment of the invention, in which the menu displayed to the user comprises a cascading menu.

FIG. 4 is a flow chart illustrating the steps for implementing a transformation operation according to an illustrative embodiment of the invention. For in a first step 50, the modeling application detects an action or operation of the user associated with performing a transformation operation on a selected object, such as a "right-click drag operation" using a mouse. Then the modeling application determines whether the selected object supports a transformation operation other than a standard copy operation in step 52. If the selected object does not support a transformation operation, the modeling application performs a copy operation on the selected object in step 53. If the selected object does support a transformation operation other than a standard copy operation, the modeling application caches information related to the selected object in step 54. For example, the information that is cached includes the selected object, the system containing the selected object, the destination system and the location of the transformed block in the destination system. Then, the modeling application creates and displays a list or menu, such as a menu 420 as shown in FIGS. 5A and 5B, for displaying relevant transformation operations to a user, in step 56. The menu allows a user to select one of the displayed transformation operation. After waiting for the user selection in step 58, the application either cancels the operation in step 59, if the user does not select one of the choices on the menu, or, if the user does select one of the choices, the application processes the user selection in step 60. Step 60 involves creating a new object in memory from the selected object, applying a transformation to the new object as specified by the user, and adding the transformed object to the specified system at a specified position.

For example, as shown in FIG. 5A, in an illustrative embodiment, the present invention enables one of a selection of transformation operation to be executed in a graphical modeling environment, by selecting on a graphical object in a diagram, illustrated as a time-based block diagram. One skilled in the art will recognize that FIG. 5A illustrates one embodiment of the invention, and that the invention is not limited to time-based block diagrams. The invention may be implemented in any type of model or diagram within a graphical modeling environment. Examples of different types of transformation operations include, but are not limited to: 1) a traditional copy operation, where second graphical object inherits all the properties of first graphical object and is independent of the first graphical object, 2) a "duplicate" operation, where the second graphical object is a shadow of the first graphical object, 3) a "copy and morph" operation, where the second graphical object has one or more properties that are different from the first graphical object, and 4) a straight "morph" operation, where the first graphical object changes one or more of its properties, without creating a separate graphical object. A "shadow" refers to a graphical object that is a duplicate of and dependent on a first graphical object. A "shadow" graphical object has the properties as the first graphical object, and is fed the same input signal and outputs the same output signal as the first graphical object.

In the embodiment shown in FIG. 5A, when a user selects a graphical object 410 in a block diagram 400, a display device may display a menu 420, which presents several options to the user. The menu 420 allows a user to select from a list of displayed transformation operations to be performed on the selected graphical object 410. Depending on the selected transformation operation, the graphical object 410 is transformed to form a transformed graphical object by executing the selected transformation operation. Alternatively, the list of displayed transformation operations can be displayed on a toolbar or a roll-up menu.

In a "copy and morph" or straight "morph" operation, the transformed graphical object can be of a different class altogether from the original graphical object, with its property values being derived from that of the original graphical object. Typically, the transformed graphical object is an instance of a subclass of the original graphical object or an instance of a superclass of the original graphical object. If the transformed graphical object is an instance of a subclass of the original graphical object, its property values are copied from the original graphical object with any additional properties being set to default values. If the new graphical object is an instance of a superclass of the original graphical object, only the relevant subset of property values is copied.

As shown in FIG. 5B, the menu 420 may alternatively comprise a cascading menu, which comprises a series of cascading menus. As shown, the cascading menu 420 allows a secondary menu 420b to be called from another menu 420a. As shown, the fields of the primary menu 420a include an arrow, indicating that there are one or more choices associated with that field. For example in the illustrative embodiment, the primary menu 420a displays a plurality of options to a user for performing a transformation operation on a selected graphical object when the user selects the graphical object in a model, as described above. If a user is interested in performing a type of transformation operation represented by "transformation operation #1" in field 421, the user drags the cursor to the right side of field 421, while holding down the mouse button, which causes the secondary menu 420b to appear. The secondary menu 420 gives a plurality of options for the selected transformation operation, from which the user can select. One skilled in the art will recognize that the cascading menu 420 may comprise any suitable number of levels and may provide any suitable number, type or combination of choices to a user for executing a transformation operation on a graphical object.

Figure 6A:
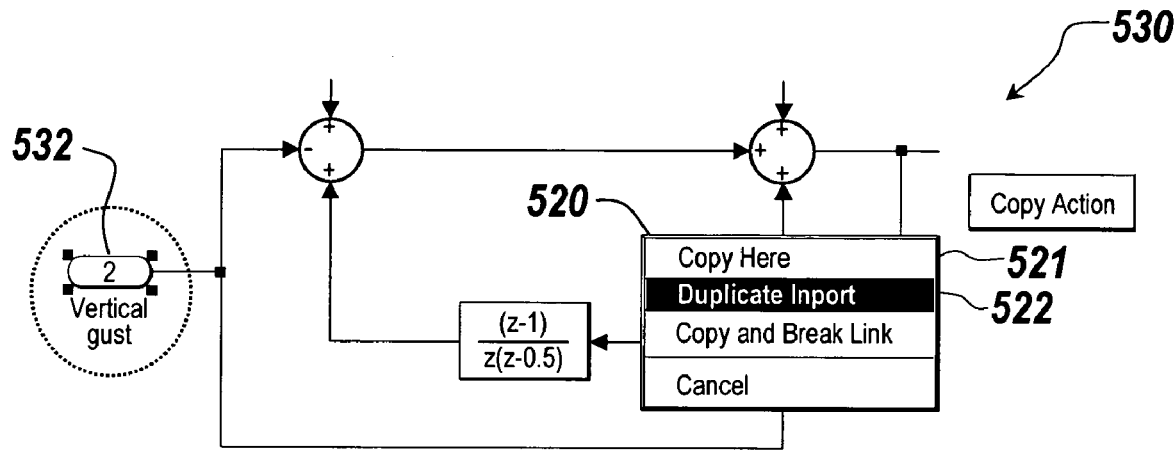
FIGS. 6A and 6B illustrate a duplication operation performed on an inport block in a block diagram according to an illustrative embodiment of the invention.
Figure 6B:
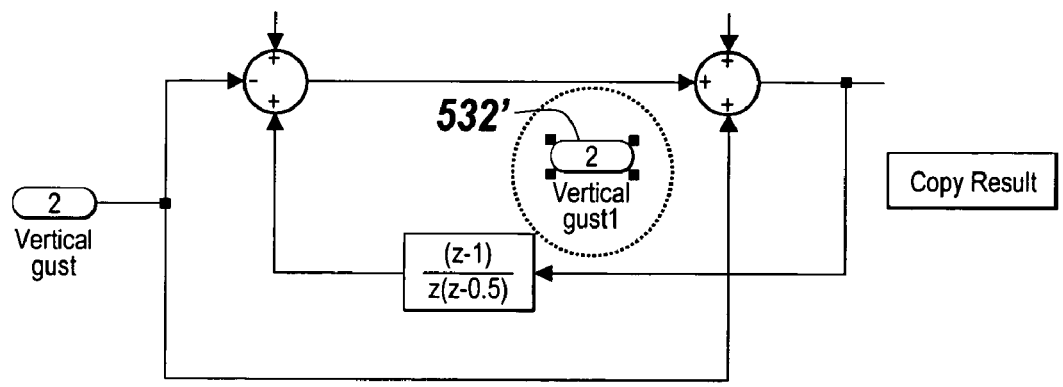

FIGS. 6A and 6B demonstrates an illustrative embodiment of the application, in which a user selects a "duplicate" operation from a list of potential transformation operations to be performed on a selected graphical object in a block diagram. FIGS. 6A and 6B illustrates a duplication operation that is performed on an inport block, for example, an inport block 532 of a subsystem 530 of a block diagram. The duplication operation allows creation of blocks, such as inport block, which have the identical port number as the original block. This can then be used to rewire the block diagram such that the same input signal can be fed into multiple blocks without having to branch the line and thus prevent potential overlaps with other lines.

As shown in FIG. 6A, a right-click drag operation on the inport block 532 causes the modeling application to display a context menu 520 which provides the user with the option of performing a copy operation (field 521) or a duplication operation (field 522) on the inport block 532. A copy operation, executed by selecting field 521, results in an inport block with a new port number, as shown in FIG. 3 and described above. A duplication operation, executed by selecting field 522, duplicates the inport block 532 at the location in the block diagram indicated by the menu, such that the inport block is transformed to an inport shadow block 532' that is a subclass of the original inport block 532. The duplicated block 532' derives its property values from the original block 532 and has the same port number ("2") as the original inport block. The result of this transformed copy is shown in FIG. 5B.

The existence of the thus-created inport shadow block 532' is dependent on the original inport block 532 i.e., there is a parent-child relationship in place. In any given system, there can be only one parent inport of a given port number. However, there can be many inport shadow blocks associated with the parent inport block.

Figure 7:
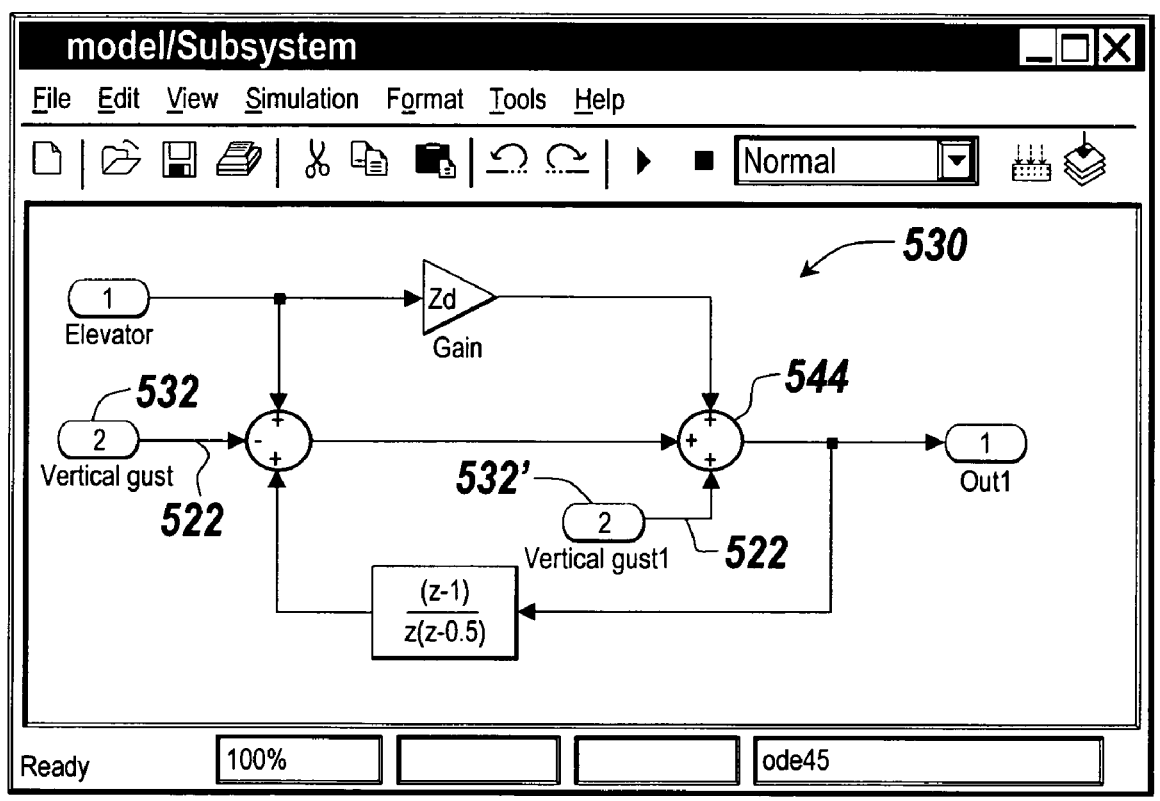
FIG. 7 illustrates the block diagram of FIGS. 6A and 6B after performing the duplication operation on the inport block.

FIG. 7 illustrates the subsystem 530 of FIGS. 6A and 6B after creation of a duplicated inport port 532' according to an illustrative embodiment of the invention. As shown, the duplication operation simplifies the resulting subsystem layer of the block diagram by eliminating the confusion caused by intersecting lines, for example, the intersecting lines in the block diagram 200 of FIGS. 2 and 3. The signal 522 from the duplicated inport block 532' is the same signal, which the same values, as the signal 522 from the "parent" inport block 532. The duplicated inport block 532' essentially mirrors the properties and functionality of the parent inport block, such that the input to the summing block 544 is the same as the output of the parent inport block 532, while reducing the amount of lines in the block diagram.

According to another aspect, a shadow block, such as the inport shadow block 532' can transform into the superclass of the block, i.e., an inport block, using the context menu mechanism. The ability to create a duplicated Inport block simplifies of the wiring of block diagrams to avoid crossing wires.

Another transformation operation that may be implemented in a block diagram environment according to an illustrative embodiment of the invention is a "copy and morph" operation. Execution of a "copy and morph" operation on a first graphical object creates a second graphical object based on the first graphical object, but having properties that are different from the first graphical object. A "copy and morph" operation further simplifies block diagrams and reduces the amount of time required to enter data into a block diagram.

According to an illustrative embodiment, the mechanism to create a "copied and morphed" graphical object from an original graphical object is a context menu, similar to the context menu used to perform the "duplicate operation", as described with respect to FIGS. 6A, 6B and 7. According to one embodiment, the context menu may also display a list of potential transformation operations that may be performed on the graphical object, including a "copy and morph" operation, allowing the user to select the "copy and morph" operation from the list. Alternatively, the "copy and morph" operation is associated with a particular command entered in a command line editor or a particular action by the user, so that the user may directly select and execute the "copy and morph" operation without selecting from a list of other transformation operations.

In an illustrative embodiment of the invention, the first graphical object is unchanged by the "copy and morph" operation. However, one skilled in the art will recognize that a "copy and morph" operation, in addition to creating a second graphical object based on the first graphical object, could also modify one or more properties of the first graphical object.

Figure 8:
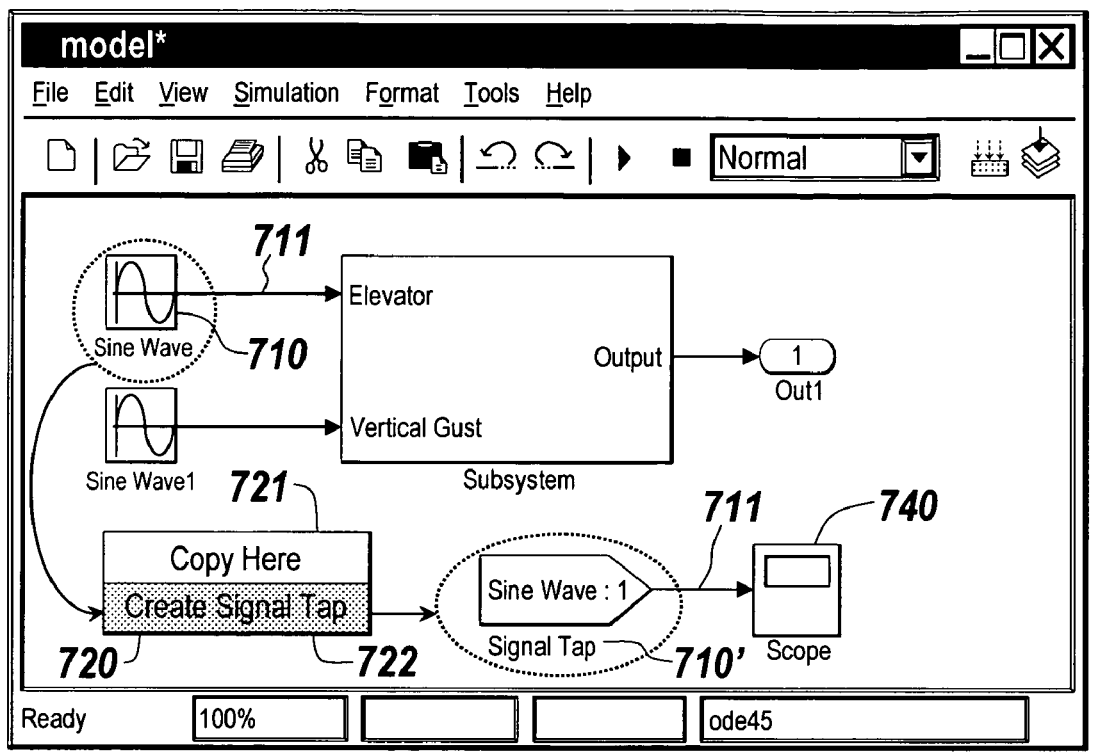
FIG. 8 illustrates an example of a copy and morph operation performed on a block in a block diagram according to an embodiment of the invention.
Figure 9:
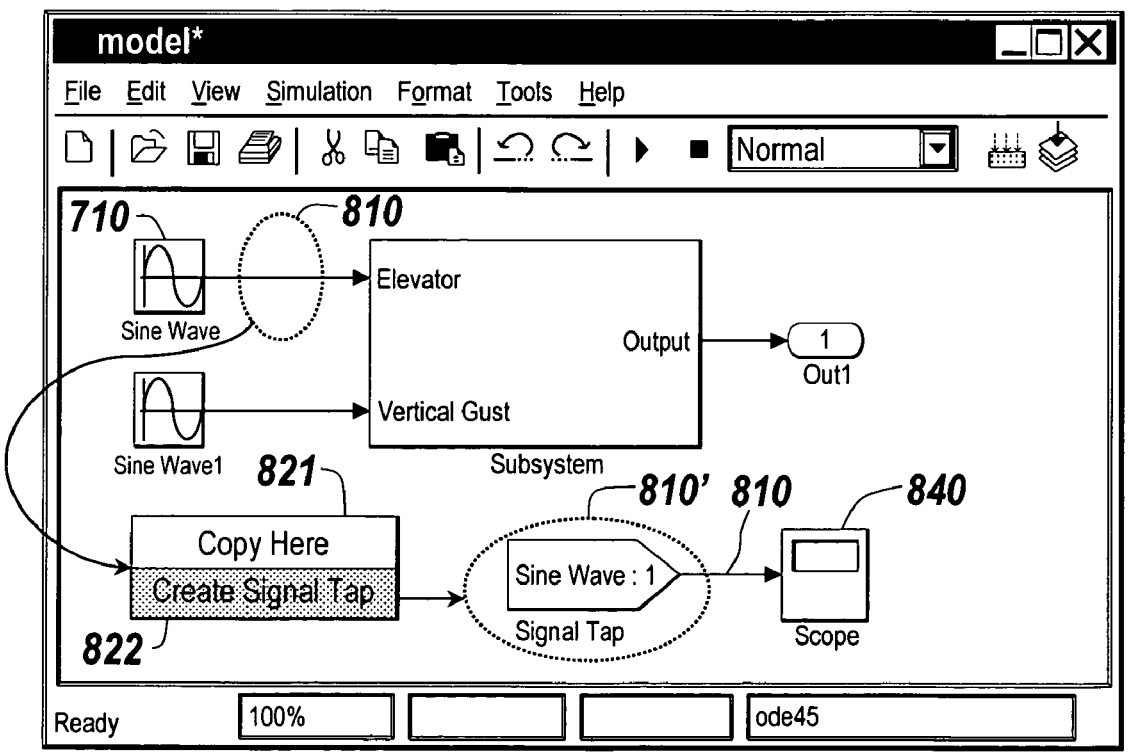
FIG. 9 illustrates an example of a copy and morph operation performed on a line in a block diagram according to an embodiment of the invention.

An example of one type of "copy and morph" operation is shown in FIGS. 8 and 9. As shown in FIGS. 8 and 9, the execution of a copy and morph operation copies a first graphical object and morphs the properties of the first graphical object to create a second graphical object based on the first graphical object. In the embodiment shown in FIGS. 8 and 9, a user creates a "signal tap block" based on a selected graphical object. A signal tap operation allows a user to create a transformed graphical object, such as a signal tap block 710' shown in FIG. 8, having a wireless connection to the original graphical object from which it is created. The output of the morphed block created by a signal tap operation is the same as the output of the original graphical object. The transformed block thus replaces the line that would have to be drawn from the source to the destination, hence reducing block diagram clutter. One skilled in the art will recognize that a "copy and morph" operation is not limited to a signal tap operation and that any suitable property of a second graphical object based on a first graphical object may be morphed during a "copy and morph" operation on the first graphical object.

According to an illustrative embodiment, the mechanism to create a signal tap block is via a context menu, similar to the context menu used to perform the "duplicate operation", as described above. One skilled in the art will recognize that the invention is not limited to the illustrated embodiment, and that any suitable mechanism for copying and morphing a first graphical object to create a second graphical object based on the first graphical object may be used in accordance with the teachings of the present invention.

According to the embodiment shown in FIG. 8, a signal tap block may be created by copying and morphing a block object. The transformation in the embodiment shown in FIG. 8 involves morphing a first block class into a completely different block class. In the example shown in FIG. 8, a source block, illustrated as a Sine Wave block 710 is transformed into the Signal Tap block 710' via a "copy and morph" operation. As shown in FIG. 8, a user first selects the graphical object, i.e., the Sine Wave block 710, which causes the GUI to display a context menu 720 presenting the user with the option of copying the selected graphical object in field 721, or creating a Signal Tap based on the selected graphical object in field 722. When the user highlights and selects field 722, the block diagram editor 6a creates a Signal Tap block 710' based on the Sine Wave block 710. The Signal Tap block 710' has a wireless connection to the Sine Wave block 710 and the output signal of the Signal Tap block 710', represented by line 711, is the same as the output signal of the Sine Wave block 710, also represented by line 711. As shown, the use of a "copy and morph" operation, illustrated as a "signal tap" operation, avoids potentially complex wiring from the Sine Wave block 710 to the Scope block 740, which displays the output of the Sine Wave block 710 by connecting to the Signal Tap block 710'.

According to another embodiment, as shown in FIG. 9, a signal tap block 810' is created by copying and morphing a line object 810. The transformation in the embodiment shown in FIG. 9 involves morphing a line class into a block class. In the example shown in FIG. 9, a line object 810, which represents the output signal from the Sine Wave block 710, is transformed into the Signal Tap block 810' via a "copy and morph" operation. As shown in FIG. 9, a user first selects the graphical object, i.e., the line 810, which causes the GUI to display a context menu 820 presenting the user with the option of copying the selected graphical object in field 821, or creating a Signal Tap based on the selected graphical object in field 822. When the user highlights and selects field 822, the block diagram editor 6a creates a Signal Tap block 810' based on the line 810. The Signal Tap block 810' has a wireless connection to the line 810, and the output 810 of the Signal Tap block 810' is the same as the signal represented by the line 810. The output line 810 of the Signal Tap block 810' connects to a scope 840, which displays the signal generated by the Sine Wave block 710, represented by the line 810, which is the same as the signal represented by the output line 810 of the Signal Tap block 810'.

Figure 10:
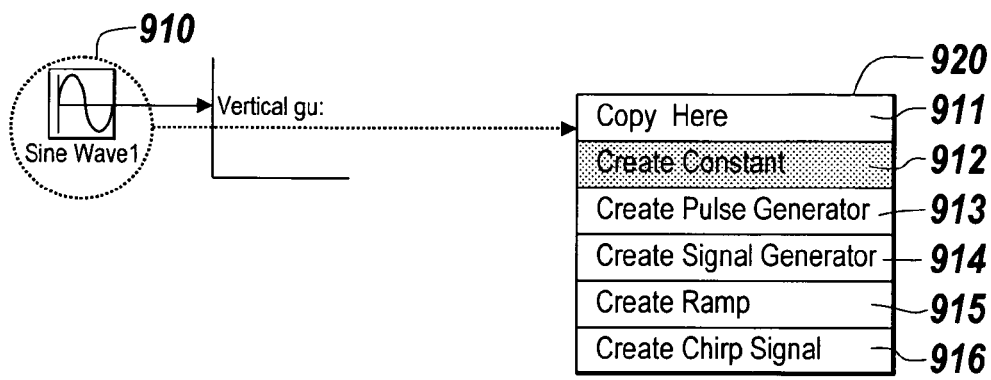
FIG. 10 illustrates a block diagram of an illustrative embodiment of the invention in which a plurality of transformation operations for creating a functionally related graphical object is presented to a user upon selection of a graphical object.

FIG. 10 illustrates an example of an implementation of an embodiment of the present invention, wherein a user can select between several types of "copy and morph" to be executed on a selected graphical object. As described above, in one embodiment of the invention a "copy and morph" operation may be implemented through a context menu, wherein the menu displays options for creating a transformed graphical object based on a first graphical object. In the embodiment shown in FIG. 10, selection of a first graphical object 910 in a block diagram causes the modeling application to display a context menu 920 displaying options for automatically creating a transformed graphical object that is functionally related to the first graphical object.

In a block diagram, each block used to create the block diagram falls under a particular category based on its functionality. For example, in Simulink® a Sine Wave block is a source block that creates a sine wave. Other source blocks for creating a particular type of signal include, but are not limited to: a constant block, which generates a constant value, a pulse generator block, which generates pulses at regular intervals, a step block, which generates a step function, a ramp block, which generates a constantly increasing or decreasing signal and an input port block, which provides an input port for a subsystem. Another type of source block is a chirp signal block, which generates a sine wave with increasing frequency. A signal generator is another type of source block, which generates various waveforms. One skilled in the art will recognize that a source block may be any type of block that generates a signal.

Another category of blocks in a typical time-based block diagram, such as Simulink® includes "continuous blocks" which perform a continuous operation in a signal that is input to the continuous block. Examples of continuous blocks include, but are not limited to: an integrator block, which integrates a signal, a derivative block, which outputs the time derivative of an input signal, a memory block, which outputs the block input from a previous time step, a transfer function block, which implements a linear transfer function on the signal, a state-space block, which implements a linear state-space system, a delay block, which delays the input by a selected or variable amount of time, and a zero-pole block, which implements a transfer function specified in terms of poles and zeros on the block.

Another category of blocks includes "discrete blocks", which implement a discrete operation on a signal. For example, a discrete filter block implements IIR and FIR filters on a signal, and a discrete state-space block implements a discrete state-space system. A discrete time-integrator block performs discrete time integration of a signal. A discrete transfer function block implements a discrete transfer function. Other blocks that fall under the "discrete" category are known in the art.

Yet another category of blocks includes "Functions and Tables", which implement a function or a table. For example, a Function block applies a specified expression to an input. Various types of Look-Up-Table blocks perform mapping of an input. A polynomial block calculates an output given by a polynomial coefficient. An S-function block accesses an S-function. Other suitable "Functions and Tables" blocks are known in the art.

"Math" blocks comprise another functionality category of blocks. Examples include, but are not limited to an absolute value block, which outputs the absolute value of an input, a combinational logic block, which implements a truth table, a gain block, which multiplies the block input, a matrix gain block, which multiplies the block input by a matrix, a rounding function bloc, which performs a rounding function, a summing block, which generates a sum of inputs and a sign block, which indicates the sine of the input. Other "Math" blocks are known to those of ordinary skill in the art.

Another category of functionally related blocks is "Nonlinear" blocks, which perform a nonlinear function on a signal that is input to the block. Examples include, but are not limited to: various switching blocks, which switch between different inputs, a quantizer block, which discretizes an input at a specified interval, a saturation block, which limits the range of a signal, a dead zone block, which provides a region of zero output and a relay block, which switches an output between two constants.

"Signals and Systems" form another category of blocks. For example, an assignment block is a "Signals and Systems" type of block that assigns values to specified elements of a signal. A bus creator block creates a bus signal from the input signals. A bus selector block degroups a bus signal and outputs the selected input signals.

"Sink" blocks, which form another category, are used to sink a signal. Sink blocks perform the inverse, or opposite, function of source blocks.

"Subsystem" blocks comprise yet another category of blocks and include many different types of subsystems.

As shown in FIG. 10, according to one implementation, selecting a block for a transformation operation that is part of a function group could then create a second block from the functional group. For example a Sine block, which is a source block, could transform to a pulse generator, which is also a type of source block. In another example, a Transfer function block, which is a type of continuous block, could transform to a Zero-pole block, which is another type of continuous block. In the embodiment shown in FIG. 9, a sine wave block 910 is selected for a transformation operation, for example using a "right-click drag mouse operation." In response to the user selecting the sine wave block, the modeling application displays a context menu 920, which gives the user several options for performing a transformation operation on the selected block. The user can then select the transformation operation of their choice and the Sine Wave block is transformed to the appropriate selection. For example, in the illustrative embodiment, the menu 920 presents the user with the option of simply copying the sine wave block 910, or copying and morphing the sine wave block to one of many other possible signal source blocks. For example, if the user selects field 911, the diagramming application will simply copy the sine wave block 910 to create a new sine wave block in the block diagram. Alternatively, the user can select field 912, which creates a constant block. If the user selects field 913, a pulse generator block is created in the block diagram. Selection of field 914 creates a signal generator block, while selection of field 915 creates a ramp block. The user can also select field 916, which generates a chirp signal block. One skilled in the art will recognize that the list of transformation operations in the illustrative menu 920 is merely illustrative and that any number, type or combination of potential transformation signals may be displayed to execute a transformation operation on a selected graphical object.

In the illustrative embodiment, field 912 is highlighted to demonstrate selection of the copy and morph operation that creates a constant block based on the sine wave block 910, though one skilled in the art will recognize that the user is able to select any of the options displayed in the menu 920 to execute a selected operation on the selected graphical object.

One skilled in the art will recognize that a user may also create a functionally related graphical object by executing a copy and morph operation on a selected graphical object through other mechanisms. For example, a user can alternatively create a functionally related graphical object using by entering a particular command in the application, or performing a particular action associated with a copy and morph operation.

Figure 11:
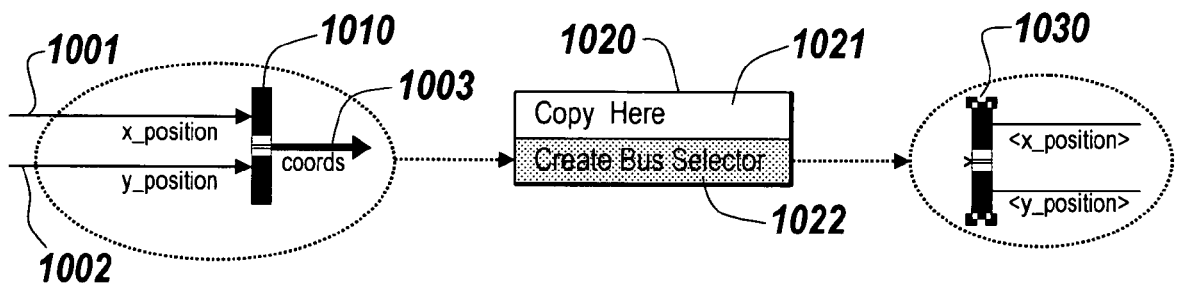
FIG. 11 illustrates an example of a "copy and morph" type of transformation operation whereby an inverse graphical object of a selected graphical object is created in a block diagram.

According to yet another embodiment of the invention, as shown in FIG. 11, a "copy and morph" transformation operation may be used to create a second graphical object that is an "inverse" of the original graphical object. For example, in many modeling applications, certain graphical objects are usually used in conjunction with another graphical object. For example, in Simulink, there are several such examples of pairs of blocks that are complementary and perform the inverse operation of the other. A bus creator block creates a bus signal by combining several component signals into a bus signal, while a bus selector block allows the user to degroup a bus signal. A Goto block broadcasts a signal that can then be received by a From block. A Data Store Read block can read data written at a particular memory location by the Data Store Write block. As shown in FIG. 10, an embodiment of the present invention allows a user to copy and morph a first block into a second block that is the inverse of the first block.

For example, FIG. 11 illustrates a portion of a block diagram including a bus creator block 1010, which combines two component signals 1001 and 1002 into a single bus signal 1003. According to one application, a user may select the bus creator block 1010 for a transformation operation, which causes the modeling application to display a context menu 1020 displaying one or more possible transformation operations to be executed on the selected block. As shown, the context menu 1020 give the user the option of copying the bus creator block 1010 to create another bus creator block in the block in the block diagram, by selecting field 1021. Alternatively, the user may select field 1022 to copy and morph the bus creator block 1010 into a bus selector block 1030, which performs a function that is complementary to the original bus creator block 1010. In this manner, a user accelerates construction of the block diagram by allowing a user to create an inverse block based on a first block, without having to return to a library to copy the inverse block into the block diagram.

In another embodiment, a bus signal can be automatically created from multiple output ports by performing a transformation operation on the output ports or signals output from the output ports. Alternatively, a bus signal can be automatically divided into its component signals by selecting the bus signal and transforming the bus signal to form the component signal using the mechanisms described herein.

In another embodiment, selection of a Goto block for a transformation operation presents a user with the option of creating a From block in the block diagram. One skilled in the art will recognize that a transformation operation can be executed on any graphical object having an inverse to create the inverse graphical object.

Figure 12:
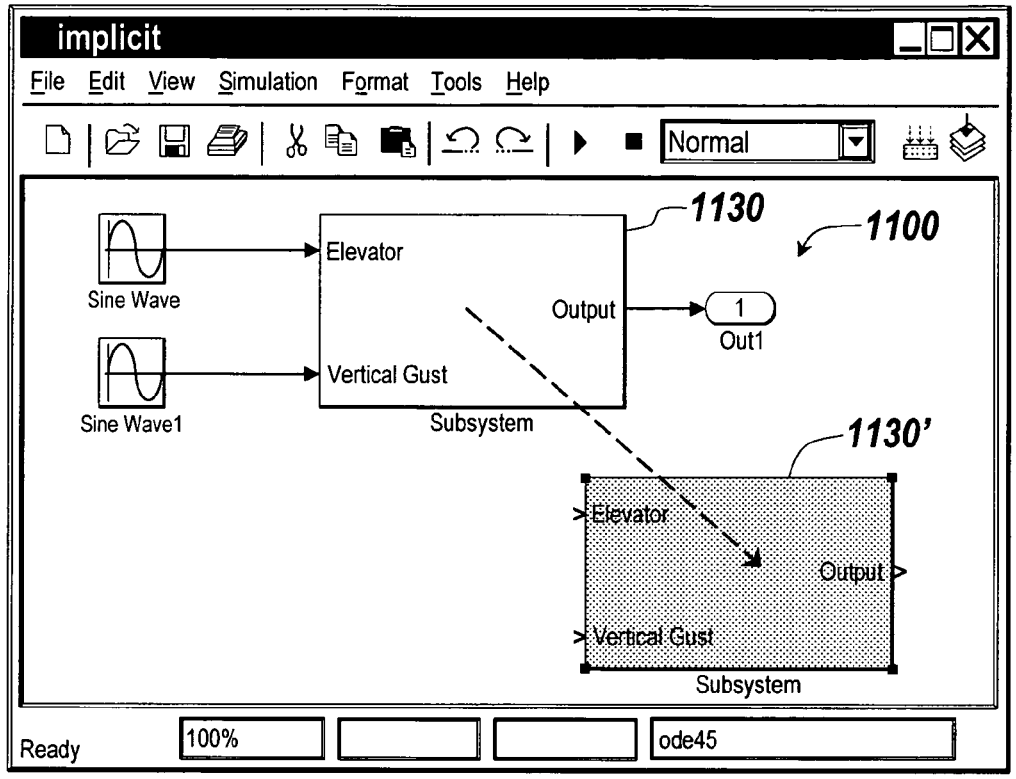
FIG. 12 illustrates an example of a copy-type transformation operation, whereby a child graphical object is created that has implicit links to the parent graphical object.

An example of another type of transformation operation that may be performed on a selected graphical object according to an illustrative embodiment of the invention is shown in FIG. 12. As shown in FIG. 12, selection of a graphical object, such as the subsystem 1130 in the block diagram 1100, may create a copy of the selected graphical object, which has implicit links to the original graphical object.

In the current state of the art, a graphical object that is a copy of an original graphical object can be modified independently of the original graphical object. According to an illustrative embodiment, the present invention also provides the user with the option of creating a copied graphical object that is implicitly linked to the original graphical object, such that the copied graphical object remains identical to the original graphical object at all times. Any changes made to the original graphical object is then made simultaneously to-all implicitly linked copies of that graphical object, thus maintaining the copied graphical object in a consistent state with the original graphical object.

For example, as shown in FIG. 12, when the user selects subsystem 1130 for a transformation operation, a context menu may appear, for example by performing a right-click drag mouse operation. The context menu may provide the user the choice of performing a standard copy operation on the subsystem 1130, or creating an implicitly linked copy 1130' of the subsystem. In FIG. 12, the subsystem 1130 is an implicitly linked copy of the subsystem 1130, such that any changes made to the original subsystem 1130 are carried forward to the copied subsystem 1130.

One skilled in the art will recognize that the present invention is not limited to using a context menu to create an implicitly linked copy of a graphical object and that any suitable mechanism, including particular commands entered by the user, may be used to execute an implicitly linked copy operation.

According to yet another embodiment of the present invention, a transformation operation executed on a graphical object in a block diagram may be used to perform an in-place morphing on the selected graphical object. A morphing operation involves converting a graphical object by changing one or more properties of the graphical object. A morphing operation may be implemented using a context menu, a command line editor, or other action associated with executing a morphing operation on a graphical object.

Figure 13:
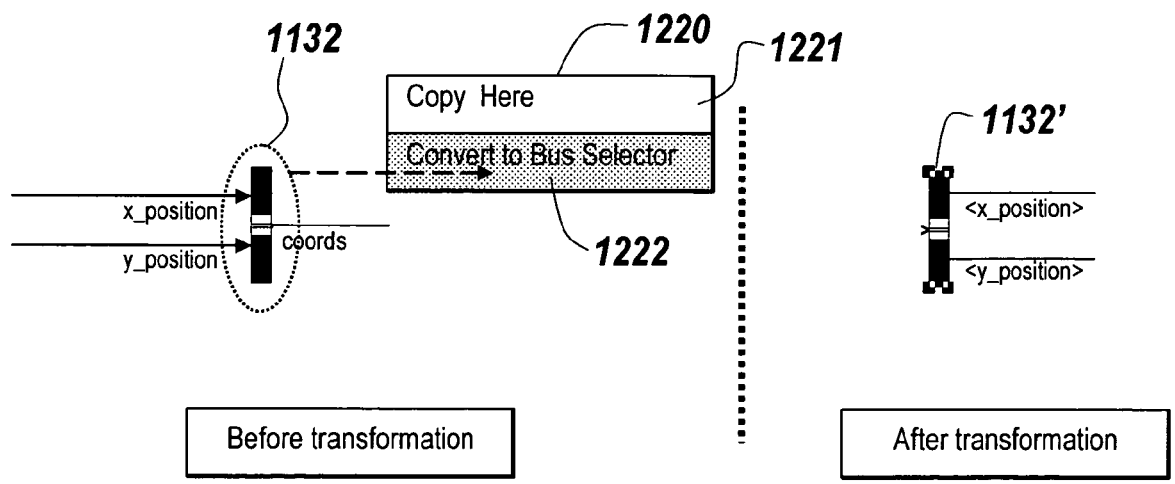
FIG. 13 illustrates an example of a straight morphing-type of transformation operation according to an illustrative embodiment of the invention.

FIG. 13 illustrates an example of a straight morphing operation performed in a block in a block diagram. In the embodiment shown in FIG. 13, the morphing operation is implemented by a context menu 1220 that displays a plurality of different transformation operations for a selected block to the user, including performing a morphing operation on the selected object, though one skilled in the art will recognize that any suitable mechanism for executing a morphing operation may be used. As shown, the morphing operation may be used to convert a first block into a second block that is the inverse of the first block. For example, in the embodiment of FIG. 13, a user selects field 1222 in the context menu 1220 convert a bus creator block 1132 into a bus selector block 1132'. In the illustrative embodiment, the user also has the option of performing a copy operation on the bus creator block 1132 by selecting field 1221 of the context menu.

One skilled in the art will recognize that a morphing operation can be performed on any suitable graphical object to change one or more properties of the graphical object, and that the invention is not limited to creating an inverse block of a selected block in a block diagram.

In another application of the present invention, a user can customize a transformation operation. In many instances, a user of a modeling program develops specialized blocks for a particular use in their applications. For example, an automotive user might have different versions of an engine. For such a scenario, it would be highly useful to extend the capability of a transformation operation, so that the user may easily be able to drop in a 4 cylinder engine versus a 6 cylinder engine. In one embodiment, the graphical method of accessing user-customized transformation operations may comprise a context menu that is shown upon a right-click drag operation.

The multi-option transformation operation enabled by the illustrative embodiments of the present invention is highly useful for systems where only a certain number of parent graphical objects (typically one) can exist along with numerable child graphical objects. In this case, the parent graphical object (once the ceiling on the number of such graphical objects has been reached) within the same system, can be copied and morphed into a child graphical object. Then, the child graphical object can be copied and morphed into a parent graphical object in a new empty system. Maintaining these systems in a consistent state requires the ability to morph a graphical object as an indirect result of another operation, such as a delete. Thus, in such systems, deleting a parent graphical object would result in a child graphical object assuming responsibility of the parent graphical object and morphing into the parent graphical object.

One skilled in the art will recognize that any suitable mechanism for implementing a transformation operation may be used according to the teachings of the present invention. For example, a command line mechanism may be used to implement a transformation operation on a graphical object. In Simulink®, a command line mechanism for copying blocks is called add_block. The existing syntax for using this command is:

add_block(blockToBeCopied, newBlock)

where blockToBeCopied and newBlock are valid Simulink identifiers.

According to an illustrative embodiment of the invention, a command line copy mechanism can be augmented to allow the user to specify additional transformation options. For example, a suitable command for implementing a transformation operation using a command line mechanism in Simulink® is:

add_block(blockToBeCopied, newBlock, 'CopyOption', option)

where option is the transformation that will happen during the copy. As described above, the transformation may be a duplicate operation, a type of copy and morph operation, a type of morphing operation, or any other type of transformation operation for creating a transformed graphical object based on a first graphical object.

In another embodiment, accelerator keys (keyboard shortcuts) can be associated with the different types of transformation operations, such that when a user presses a particular combination of keys on the keyboard, the operating system executes the associated transformation operation.

Voice commands provided by the operating system can be also associated with the different types of transformation operations. A particular voice command can be input to the operating system to execute the associated transformation operation.

As described above, the present invention provides an enhanced graphical modeling environment, which enables clear and concise block diagrams and efficient data entry. By providing a plurality of options to a user for performing a transformation operation on a selected graphical object, construction of a graphical model, such as a block diagram, is facilitated. A user can create relevant graphical objects in a block diagram based on a previous graphical object, without having to return to a library or create an entirely new graphical object. The user can customize transformation operations according to his or her particular needs, which further simplifies data entry.

The present invention has been described relative to an illustrative embodiment. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

The invention claimed is:

1. A method comprising:
   generating, in a block diagram modeling environment, an executable block diagram representing a system, the generated executable block diagram being simulatable over a time span;
   receiving an input for selecting a first graphical object in the executable block diagram, the first graphical object having one or more properties;
   displaying a list of one or more transformation operations performable on the first graphical object for transforming the first graphical object into a second graphical object for the executable block diagram;

receiving an input for selecting one of the one or more transformation operations;

applying, using an electronic device, the selected one of the one or more transformation operations on the first graphical object for creating the second graphical object, the second graphical object having one or more properties that are different from the one or more properties of the first graphical object;

incorporating the first graphical object and incorporating the second graphical object into the executable block diagram within the block diagram modeling environment; and simulating the executable block diagram over the time span.

2. The method of claim 1, wherein the list is displayed in one of a context menu, a toolbar or a roll-up menu.

3. The method of claim 1, wherein the first graphical object is selected by moving a pointer over the first graphical object.

4. The method of claim 1, wherein the second graphical object has a class that is different from a class of the first graphical object.

5. The method of claim 1, wherein the second graphical object is an instance of a superclass of the first graphical object.

6. The method of claim 1, wherein the second graphical object is an instance of a subclass of the first graphical object.

7. The method of claim 1, wherein the second graphical object shares a base class with the first graphical object.

8. The method of claim 1, wherein the selected transformation operation is a copy and morph operation.

9. The method of claim 1, wherein the second graphical object is a signal tap block for tapping a signal from the first graphical object.

10. The method of claim 9, wherein the first graphical object is a block having an output that represents the signal.

11. The method of claim 9, wherein the first graphical object is a line representing the signal.

12. The method of claim 1, wherein the first graphical object and the second graphical object are functionally related blocks.

13. The method of claim 1, wherein the first graphical object and the second graphical object are one of source blocks or sink blocks.

14. The method of claim 1, wherein the second graphical object is an inverse graphical object of the first graphical object.

15. The method of claim 1, wherein one of the second graphical object or the first graphical object is a bus creator block and the other of the second graphical object and the first graphical object is a bus selector block.

16. The method of claim 1, wherein the second graphical object has one or more implicit links to the first graphical object.

17. The method of claim 1, further comprising:
executing a customized transformation operation.

18. A method comprising:
generating, in a block diagram modeling environment, an executable block diagram representing a system, the generated executable block diagram being simulatable over a time span;

receiving an input for selecting a first graphical object in the executable block diagram, the first graphical object having one or more properties;

displaying a list of one or more transformation operations performable on the first graphical object;

receiving an input for selecting a transformation operation in the list;

based on the selected transformation operation, executing, using an electronic device, a copy and morph operation on the first graphical object to create a second graphical object for the executable block diagram, the second graphical object having one or more properties that are different from the one or more properties of the first graphical object;

incorporating the first graphical object and incorporating the second graphical object into the executable block diagram within the block diagram modeling environment; and simulating the executable block diagram over the time span.

19. The method of claim 18, wherein the first graphical object outputs a signal, and wherein executing the copy and morph operation further comprises:
creating a signal tap block for tapping the signal.

20. The method of claim 18, wherein the first graphical object is a line representing a signal, and wherein executing the copy and morph operation further comprises:
creating a signal tap block for tapping the signal.

21. The method of claim 18, wherein the first graphical object and the second graphical object are functionally related blocks.

22. The method of claim 18, wherein the first graphical object and the second graphical object are source blocks.

23. The method of claim 18, wherein the second graphical object is an inverse graphical object of the first graphical object.

24. The method of claim 18, wherein one of the second graphical object or the first graphical object is a bus creator block and the other of the second graphical object and the first graphical object is a bus selector block.

25. The method of claim 18, wherein the list is displayed in one of a context menu, a toolbar or a roll-up menu.

26. The method of claim 18, further comprising:
receiving a command associated with the copy and morph operation.

27. The method of claim 26, wherein the command is received from a command line mechanism.

28. A method comprising:
generating, in a block diagram modeling environment, an executable block diagram representing a system, the generated executable block diagram being simulatable over a time span;

receiving an input for selecting a first graphical object in the executable block diagram, the first graphical object having one or more properties;

receiving an input for selecting a transformation operation from the list; and based on the selected transformation operation, executing, using an electronic device, a copy and morph operation on the first graphical object to create a second graphical object for the executable block diagram, the second graphical object having one or more properties that are different from the one or more properties of the first graphical object;

incorporating the first graphical object and incorporating the second graphical object into the executable block diagram within the block diagram modeling environment; and simulating the executable block diagram over the time span.

29. The method of claim 28, wherein the second graphical object is a signal tap block for tapping a signal.

30. The method of claim 28, wherein the second graphical object is functionally related to the first graphical object.

31. The method of claim 28, wherein the second graphical object is an inverse graphical object of the first graphical object.

32. The method of claim 31, wherein one of the inverse graphical object or the first graphical object is a bus creator block and the other of the inverse graphical object and the first graphical object is a bus selector block.

33. The method of claim 28, further comprising:
displaying a list of one or more transformation operations, the displayed list being in one of a context menu, a toolbar or a roll-up menu.

34. The method of claim 28, further comprising:
receiving a command associated with the copy and morph operation.

35. The method of claim 34, wherein the command is received from a command line mechanism.

36. A computer-storage medium holding computer-executable instructions, the medium comprising one or more instructions for:
generating, in a block diagram modeling environment, an executable block diagram representing a system, the generated executable block diagram being simulatable over a time span;
receiving an input for selecting a first graphical object in the executable block diagram, the first graphical object having one or more properties;
displaying a list of one or more transformation operations performable on the first graphical object for transforming the first graphical object into a second graphical object for the executable block diagram;
receiving an input for selecting one of the one or more transformation operations;
applying the selected one of the one or more transformation operations on the first graphical object for creating the second graphical object, the second graphical object having one or more properties that are different from the one or more properties of the first graphical object;
incorporating the first graphical object and incorporating the second graphical object into the executable block diagram within the block diagram modeling environment; and
simulating the executable block diagram over the time span.

37. The medium of claim 36, further comprising one or more instructions for:
receiving an input for selecting a transformation operation from the list; and
executing the selected transformation operation on the first graphical object to create the second graphical object.

38. A computer-storage medium holding computer-executable instructions, the medium comprising one or more instructions for:
generating, in a block diagram modeling environment, an executable block diagram representing a system, the generated executable block diagram being simulatable over a time span;
receiving an input for selecting a first graphical object in the executable block diagram, the first graphical object having one or more properties;
displaying a list of one or more transformation operations performable on the first graphical object;
receiving an input for selecting a transformation operation in the list;
based on the selected transformation operation, executing a copy and morph operation on the first graphical object to create a second graphical object for the executable block diagram, the second graphical object having one or more properties that are different from the one or more properties of the first graphical object;
incorporating the first graphical object and incorporating the second graphical object into the executable block diagram within the block diagram modeling environment; and
simulating the executable block diagram over the time span.

39. A computer storage medium holding computer-executable instructions, the medium comprising one or more instructions for:
generating, in a block diagram modeling environment, an executable block diagram representing a system, the generated executable block diagram being simulatable over a time span;
receiving an input for selecting a first graphical object in the executable block diagram, the first graphical object having one or more properties;
receiving an input for selecting a transformation operation from the list;
based on the selected transformation operation, executing a copy and morph operation on the first graphical object to create a second graphical object for the executable block diagram, the second graphical object having one or more properties that are different from the one or more properties of the first graphical object;
incorporating the first graphical object and incorporating the second graphical object into the executable block diagram within the block diagram modeling environment; and
simulating the executable block diagram over the time span.

40. A system comprising:
input means for inputting data to a block diagram modeling application;
a display device for displaying an executable block diagram representing a system, the executable block diagram being simulatable over a time span, the executable block diagram containing a first graphical object, the first graphical object having one or more properties;
receiving means for receiving an input for selecting the first graphical object in the executable block diagram; and
an electronic device including memory for storing computer program instructions and data, and a processor for executing the stored computer program instructions, the computer program instructions including one or more instructions for:
displaying a list of one or more transformation operations performable on the first graphical object for transforming the first graphical object into a second graphical object for the executable block diagram,
applying a selected one of the one or more transformation operations on the first graphical object for creating the second graphical object, the second graphical object having one or more properties that are different from the one or more properties of the first graphical object,
incorporating the first graphical object and incorporating the second graphical object into the executable block diagram within the block diagram modeling application, and
simulating the executable block diagram over the time span.

41. A system comprising:

input means for inputting data to a block diagram modeling application;

a display device for displaying an executable block diagram representing a dynamic system, the executable block diagram being simulatable over a time span, the executable block diagram containing a first graphical object having one or more properties;

receiving means for receiving an input for selecting the first graphical object in the executable block diagram; and an electronic device including memory for storing computer program instructions and data, and a processor for executing the stored computer program instructions, the computer program instructions including one or more instructions for:

displaying a list of one or more of transformation operations performable on the first graphical object, based on a selected transformation operation in the list, executing a copy and morph operation on the first graphical object to create a second graphical object for the executable block diagram, the second graphical object having one or more properties that are different from the one or more properties of the first graphical object, incorporating the first graphical object and incorporating the second graphical object into the executable block diagram within the block diagram modeling application, and simulating the executable block diagram over the time span.

42. A system comprising:

input means for inputting data to a block diagram modeling application;

a display device for displaying an executable block diagram representing a dynamic system, the block diagram being simulatable over a time span, the block diagram containing a first graphical object having one or more properties;

receiving means for receiving an input for selecting the first graphical object in the executable block diagram; and an electronic device including memory for storing computer program instructions and data, and a processor for executing the stored computer program instructions, the computer program instructions including one or more instructions for:

based on a selected transformation operation, executing a copy and morph operation on the first graphical object to create a second graphical object for the executable block diagram, the second graphical object having one or more properties that are different from the one or more properties of the first graphical object, incorporating the first graphical object and incorporating the second graphical object into the executable block diagram within the block diagram modeling application, and simulating the executable block diagram over the time span.

43. The method of claim 1, further comprising:

caching information related to the first graphical object prior to displaying the list of one or more transformation operations performable on the first graphical object.

44. The method of claim 1, further comprising:

receiving an input selecting a position to place the second graphical object on the executable block diagram; and placing the second graphical object on the selected position.

\* \* \* \* \*

UNITED STATES PATENT AND TRADEMARK OFFICE
CERTIFICATE OF CORRECTION

PATENT NO. : 7,765,529 B1  Page 1 of 1
APPLICATION NO. : 10/699323
DATED : July 27, 2010
INVENTOR(S) : Sanjai Singh et al.

It is certified that error appears in the above-identified patent and that said Letters Patent is hereby corrected as shown below:

At column 2, line 45 (Specification) of the printed patent, please change "represent" to
-- represented --.

At column 2, line 56 (Specification) of the printed patent, please change "hold" to
-- holding --.

At column 21, line 50 (Claim 15, line 2) of the printed patent, please change "objector" to
-- object or --.

Signed and Sealed this

Twenty-third Day of November, 2010

David J. Kappos
*Director of the United States Patent and Trademark Office*